(12) United States Patent
Dry

(10) Patent No.: US 10,093,200 B2
(45) Date of Patent: Oct. 9, 2018

(54) RECONFIGURABLE SEATING ASSEMBLY

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 15/296,239

(22) Filed: Oct. 18, 2016

(65) Prior Publication Data
US 2018/0105076 A1 Apr. 19, 2018

(51) Int. Cl.
| | |
|---|---|
| *B60N 2/24* | (2006.01) |
| *B60N 2/16* | (2006.01) |
| *B60N 2/838* | (2018.01) |
| *B60N 2/90* | (2018.01) |
| *B60N 2/02* | (2006.01) |
| *B60N 2/22* | (2006.01) |
| *B60N 2/30* | (2006.01) |
| *B60N 3/00* | (2006.01) |
| *B60N 2/225* | (2006.01) |

(52) U.S. Cl.
CPC ......... *B60N 2/1635* (2013.01); *B60N 2/0232* (2013.01); *B60N 2/0248* (2013.01); *B60N 2/0292* (2013.01); *B60N 2/161* (2013.01); *B60N 2/164* (2013.01); *B60N 2/1665* (2013.01); *B60N 2/22* (2013.01); *B60N 2/225* (2013.01); *B60N 2/30* (2013.01); *B60N 2/3075* (2013.01); *B60N 2/838* (2018.02); *B60N 2/914* (2018.02); *B60N 2/995* (2018.02); *B60N 3/001* (2013.01)

(58) Field of Classification Search
CPC .... B60N 2/1635; B60N 2/1665; B60N 2/914; B60N 2/3075; B60N 2/225; B60N 2/164; B60N 2/161; B60N 2/0292; B60N 2/0248; B60N 3/001; B60N 2/838; B60N 2/30; B60N 2/22; B60N 2/995; B60N 2/0232
USPC ..................................................... 296/65.03
See application file for complete search history.

(56) References Cited

U.S. PATENT DOCUMENTS

| | | | | |
|---|---|---|---|---|
| 3,013,837 | A * | 12/1961 | Pessl ..................... | B60N 2/146 296/68.1 |
| 3,973,799 | A * | 8/1976 | Berg .................... | B60N 2/0292 296/65.07 |
| 6,499,787 | B2 | 12/2002 | Jach et al. | |
| 6,955,386 | B2 | 10/2005 | Rhodes et al. | |
| 7,121,608 | B2 * | 10/2006 | Billger ................... | B60N 2/002 296/65.06 |
| 7,204,554 | B2 * | 4/2007 | Wieclawski ............ | B60N 2/14 297/344.21 |
| 7,575,206 | B2 * | 8/2009 | Meier .................... | B60N 2/002 248/157 |
| 8,483,914 | B2 * | 7/2013 | Copeland ............ | B60N 2/0232 701/50 |
| 8,662,561 | B2 | 3/2014 | Runde et al. | |

(Continued)

FOREIGN PATENT DOCUMENTS

EP 1461225 B1 11/2007

*Primary Examiner* — Pinel E Romain
(74) *Attorney, Agent, or Firm* — Vichit Chea; Price Heneveld LLP

(57) ABSTRACT

A vehicle seating assembly includes a lower leg support, a seat, and a seatback. A seat rotational member rotatably couples the lower leg support to the seat. A seatback rotational member rotatably couples the seat to the seatback.

20 Claims, 27 Drawing Sheets

(56) References Cited

U.S. PATENT DOCUMENTS

| | | |
|---|---|---|
| 9,096,150 B2 | 8/2015 | Cuddihy et al. |
| 9,663,001 B2 * | 5/2017 | Haller .................... B60N 2/146 |
| 2017/0210322 A1 * | 7/2017 | Rao ................... B60R 21/01554 |

* cited by examiner

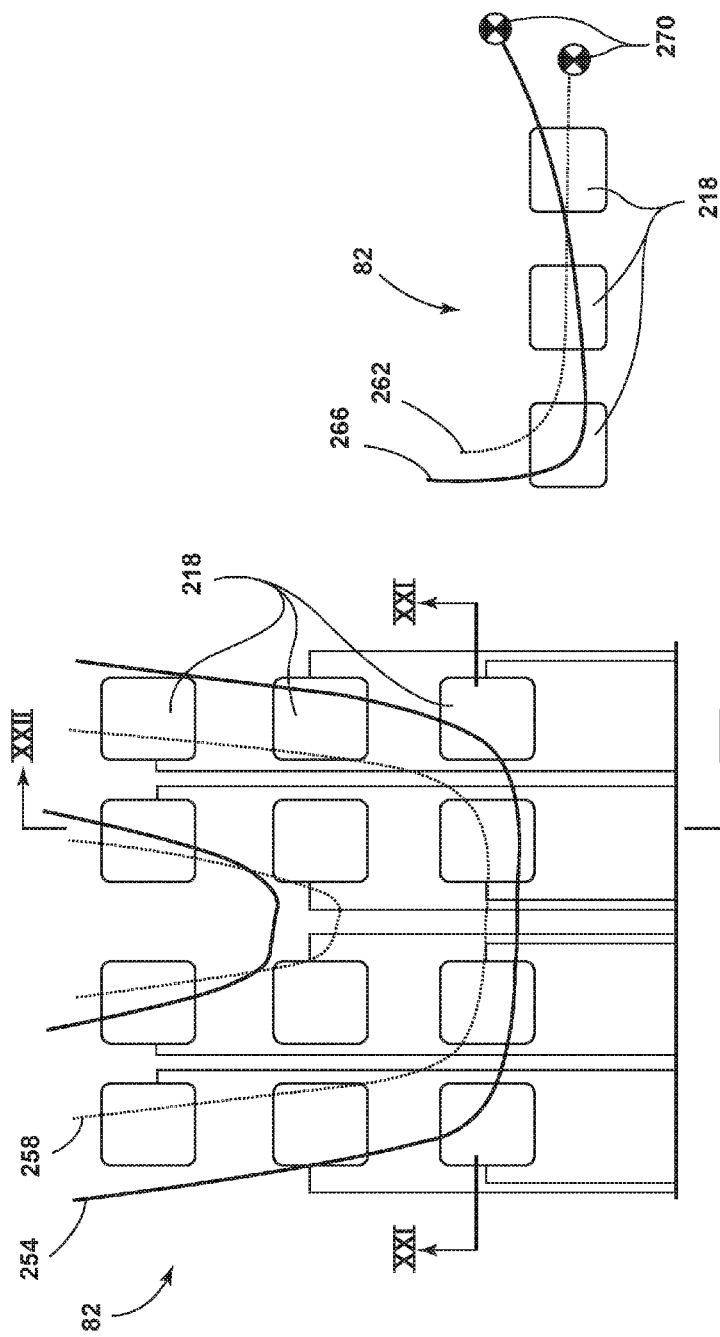
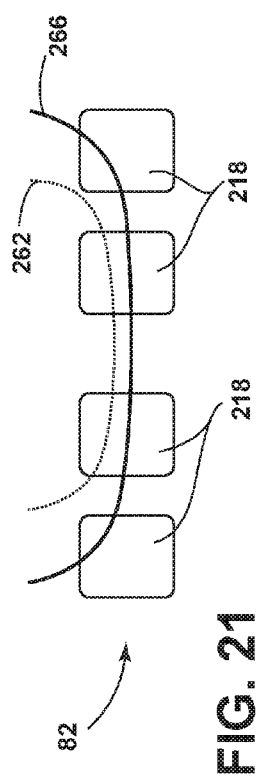
FIG. 20
FIG. 21
FIG. 22

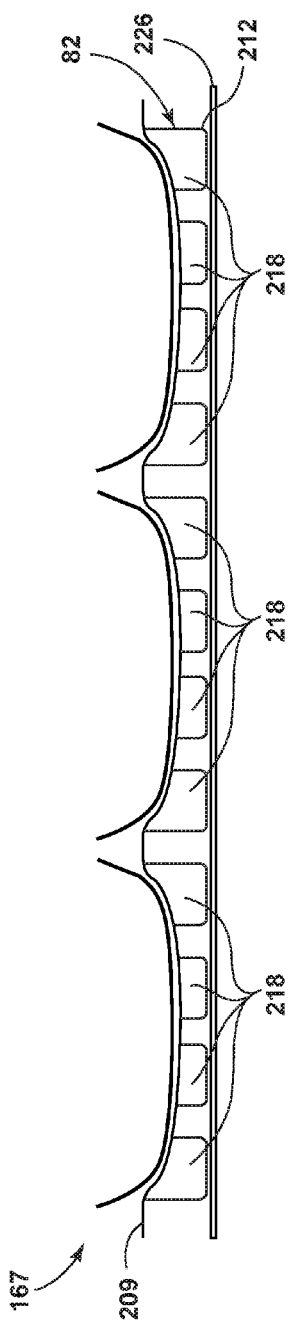
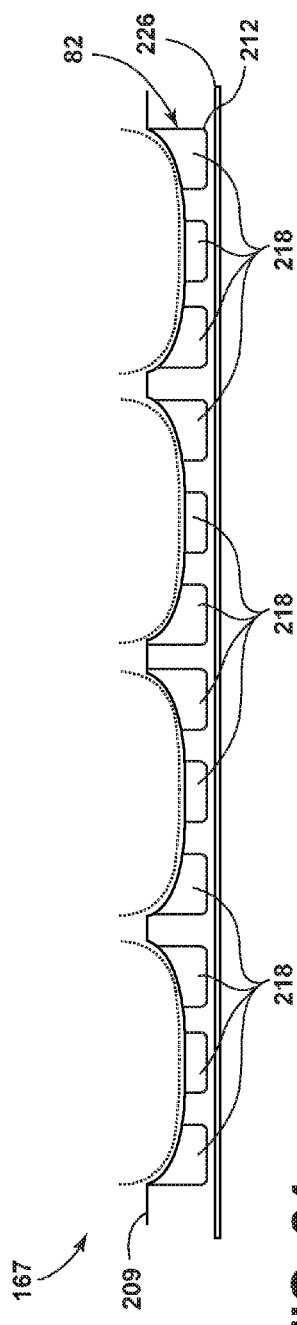
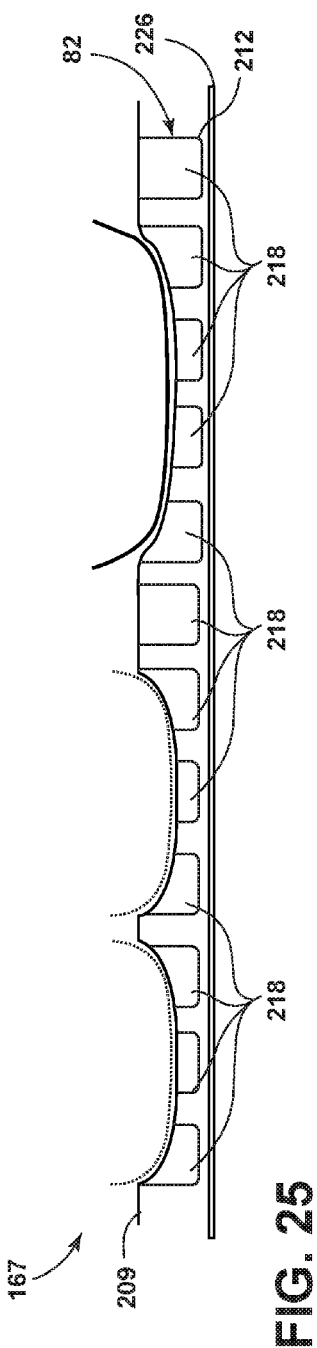

RECONFIGURABLE SEATING ASSEMBLY

FIELD OF THE DISCLOSURE

The present disclosure generally relates to a seating assembly. More specifically, the present disclosure relates to a reconfigurable seating assembly for a vehicle, such as an autonomous vehicle.

BACKGROUND

Vehicle seating assemblies are often provided with articulation or movable components. The degree of articulation is often limited to reclining motions, folding motions, and stowing motions that are usually manually performed.

SUMMARY

According to one aspect of the present disclosure, a vehicle seating assembly includes a lower leg support, a seat, a seatback, and a headrest. A seat rotational member rotatably couples the lower leg support to the seat. A seatback rotational member rotatably couples the seat to the seatback. A headrest rotational member rotatably couples the seatback to the headrest. A front latch is coupled to a carrier plate and the front latch is positioned between the carrier plate and the seat. The front latch releasably engages the seat. An anchor member couples the seatback rotational member to the carrier plate. An elevating platform is positioned below the carrier plate. A lift mechanism is positioned between the carrier plate and the elevating platform and is coupled to both the carrier plate and the elevating platform. The lift mechanism is configured to manipulate the seat by performing at least one of raising, lowering, and tilting the seat.

According to another aspect of the present disclosure, a vehicle seating assembly includes a lower leg support, a seat, and a seatback. A seat rotational member rotatably couples the lower leg support to the seat. A seatback rotational member rotatably couples the seat to the seatback. A front latch is coupled to a carrier plate. The front latch is positioned between the carrier plate and the seat. The front latch releasably engages the seat.

According to yet another aspect of the present disclosure, a vehicle seating assembly includes a lower leg support, a seat, and a seatback. A seat rotational member rotatably couples the lower leg support to the seat. A seatback rotational member rotatably couples the seat to the seatback.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 20 is a top plan view of fluid cells of the inflatable member;

FIG. 21 is a cross-sectional view of the inflatable member taken along line XXI-XXI of FIG. 20;

FIG. 22 is a cross-sectional view of the inflatable member taken along line XXII-XXII of FIG. 20;

FIG. 23 is a cross-sectional view of one embodiment of the inflatable member of a rear seating assembly taken along line XXIII-XXIII of FIG. 11;

FIG. 24 is a cross-sectional view of another embodiment of the inflatable member of the rear seating assembly taken along line XXIII-XXIII of FIG. 11;

FIG. 25 is a cross-sectional view of yet another embodiment of the inflatable member of the rear seating assembly taken along line XXIII-XXIII of FIG. 11;

DETAILED DESCRIPTION

Figure 1:
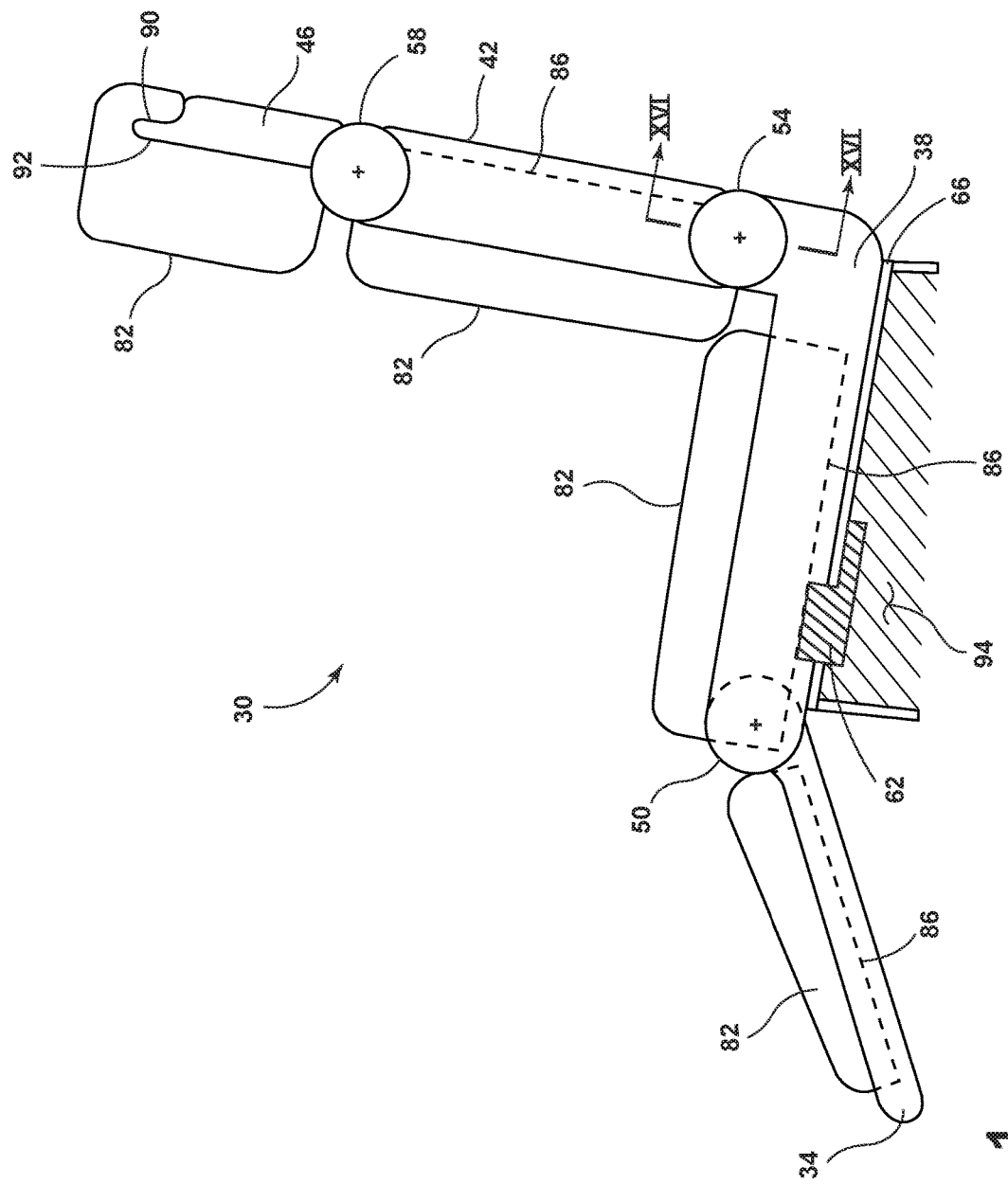
FIG. 1 is a side view of a vehicle seating assembly with inflatable members in an inflated state, according to one embodiment of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 16:
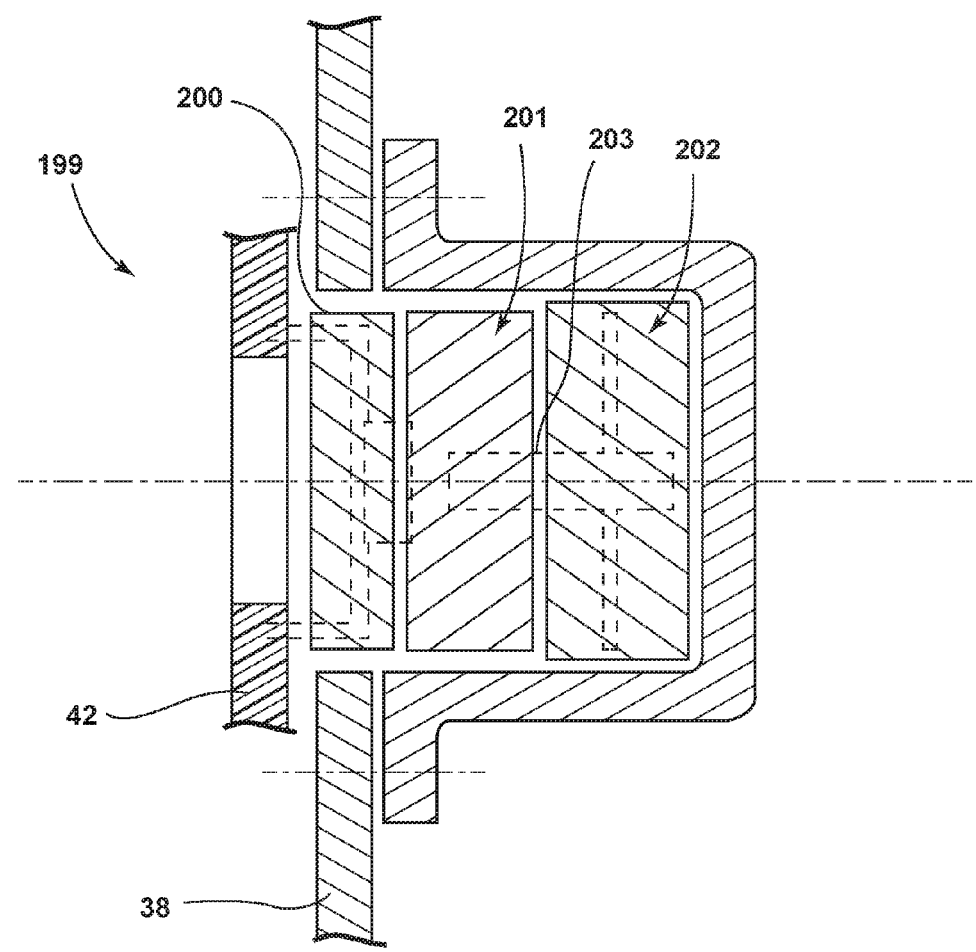
FIG. 16 is a cross-sectional view of one embodiment of a powered puck taken along line XVI-XVI of FIG. 1.
Figure 17:
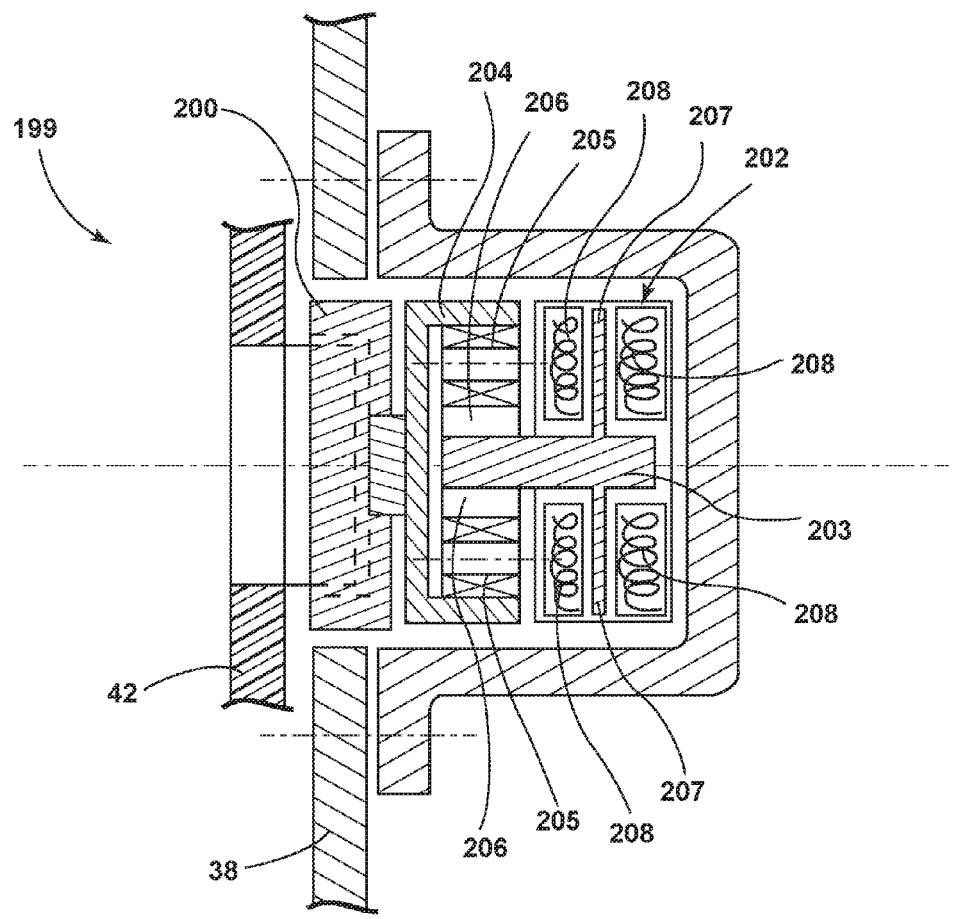
FIG. 17 is a cross-sectional view of the powered puck taken along line XVI-XVI, similar to FIG. 16, showing further detail.

Referring to FIGS. 1-17, reference numeral 30 generally designates a vehicle seating assembly. The vehicle seating assembly 30 includes a lower leg support 34, a seat 38, a seatback 42, and a headrest 46. A seat rotational member 50 rotatably couples the lower leg support 34 to the seat 38. A seatback rotational member 54 rotatably couples the seat 38 to the seatback 42. A headrest rotational member 58 rotatably couples the seatback 42 to the headrest 46. The seat rotational member 50, the seatback rotational member 54, and the headrest rotational member 58 in one embodiment are powered pucks 199 (FIGS. 16 and 17). The powered puck 199 is operably and/or rotatably coupled to the support structure(s) that is/are acted on. The support structure can be, for example, the lower leg support 34, the seat 38, the seatback 42, and/or the headrest 46. The powered pucks 199 are responsible for the transitions between the various configurations of the vehicle seating assembly 30. The configurations of the vehicle seating assembly include, but are not limited to, an open configuration, a closed configuration, a stowed configuration, a desk configuration, a projection surface configuration, a footrest configuration, and a table configuration. A front latch 62 is coupled to a carrier plate 66. The front latch 62 is positioned between the carrier plate 66 and the seat 38. The front latch 62 releasably engages the seat 38. An anchor member 70 couples the seatback rotational member 54 to the carrier plate 66. An elevating platform 74 is positioned below the carrier plate 66. A lift mechanism 78 is positioned between the carrier plate 66 and the elevating platform 74. The lift mechanism 78 is coupled to both the carrier plate 66 and the elevating platform 74 and the lift mechanism 78 is configured to manipulate the seat 38. The manipulations that the lift mechanism 78 is configured to perform upon the seat 38 include, but are not limited to, raising, lowering, and/or tilting the seat 38.

Referring now to FIG. 1, the vehicle seating assembly 30 is shown having an inflatable member 82 positioned at each of the lower leg support 34, the seat 38, the seatback 42, and the headrest 46. The inflatable members 82 in the lower leg support 34, the seat 38, the seatback 42, and the headrest 46 can be operably coupled to their respective support structures (e.g. lower leg support 34, seat 38, seatback 42, and headrest 46) within a recess 86 of the respective support structure. The inflatable members 82 can be inflated and deflated to provide support to various sizes of passengers. When in an inflated state the inflatable members 82 are in a use condition. When inflated, the inflatable members 82 extend beyond their recesses 86 in vertical and lateral directions. That is, the inflatable member 82 can be inflated to cover a cross-sectional surface area that is greater than the cross-sectional surface area of the recess 86 such that the user of the vehicle seating assembly 30 is not presented with the rigid surface of the support structure. Additionally, the inflatable members 82 can be deflated such that the inflatable members 82 recede into the recess 86 of their respective support structures. When deflated from the use condition, the inflatable members 82 are retracted into their recesses 86 in a curling manner. That is, the deflation and retraction of the inflatable members 82 can be accomplished without the aid of a guiding member; rather, the retraction of the inflatable members 82 is effected by the act of deflating the inflatable member 82. Alternative coupling arrangements between the inflatable members 82 and their respective support structures will be recognized by one of skill in the art. For example, the inflatable members 82 can be operably coupled to a rear surface 90 of the support structure. In such an embodiment, rather than retracting in a curling manner, the inflatable member 82 is configured to deflate to a deflated state that results in the inflatable member 82 being substantially coplanar with a front surface 92 of the support structure without being retracted into the recess 86. The comparative dimensions of the recesses 86 in the seat 38 and the seatback 42 are such that the lower leg support 34 and the headrest 46 can nest within the recesses 86 of the seat 38 and the seatback 42, respectively.

Referring further to FIG. 1, the seat 38 of the vehicle seating assembly 30 can be operably coupled to a base assembly 94. The operable coupling of the seat 38 to the base assembly 94 can be accomplished, for example, by the front latch 62. The front latch 62 can releasably couple the seat 38 to the base assembly 94 such that, upon release of the front latch 62 the vehicle seating assembly 30 can be articulated to various configurations where the seat 38 is rotated clockwise about the seatback rotational member 54.

Figure 2:
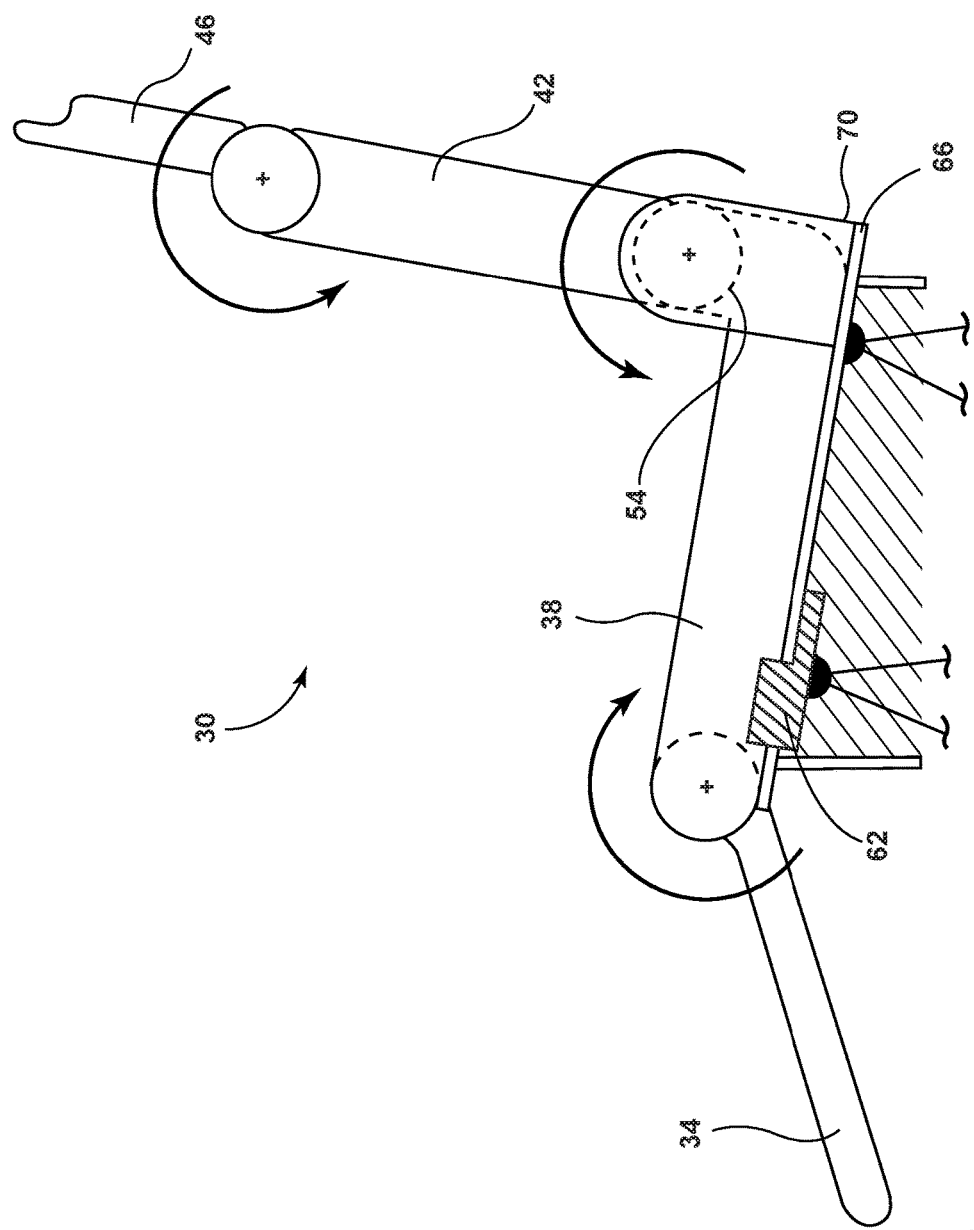
FIG. 2 is a side view of the vehicle seating assembly, similar to FIG. 1, with the inflatable members in a deflated state, according to one embodiment of the present disclosure.
Figure 3:
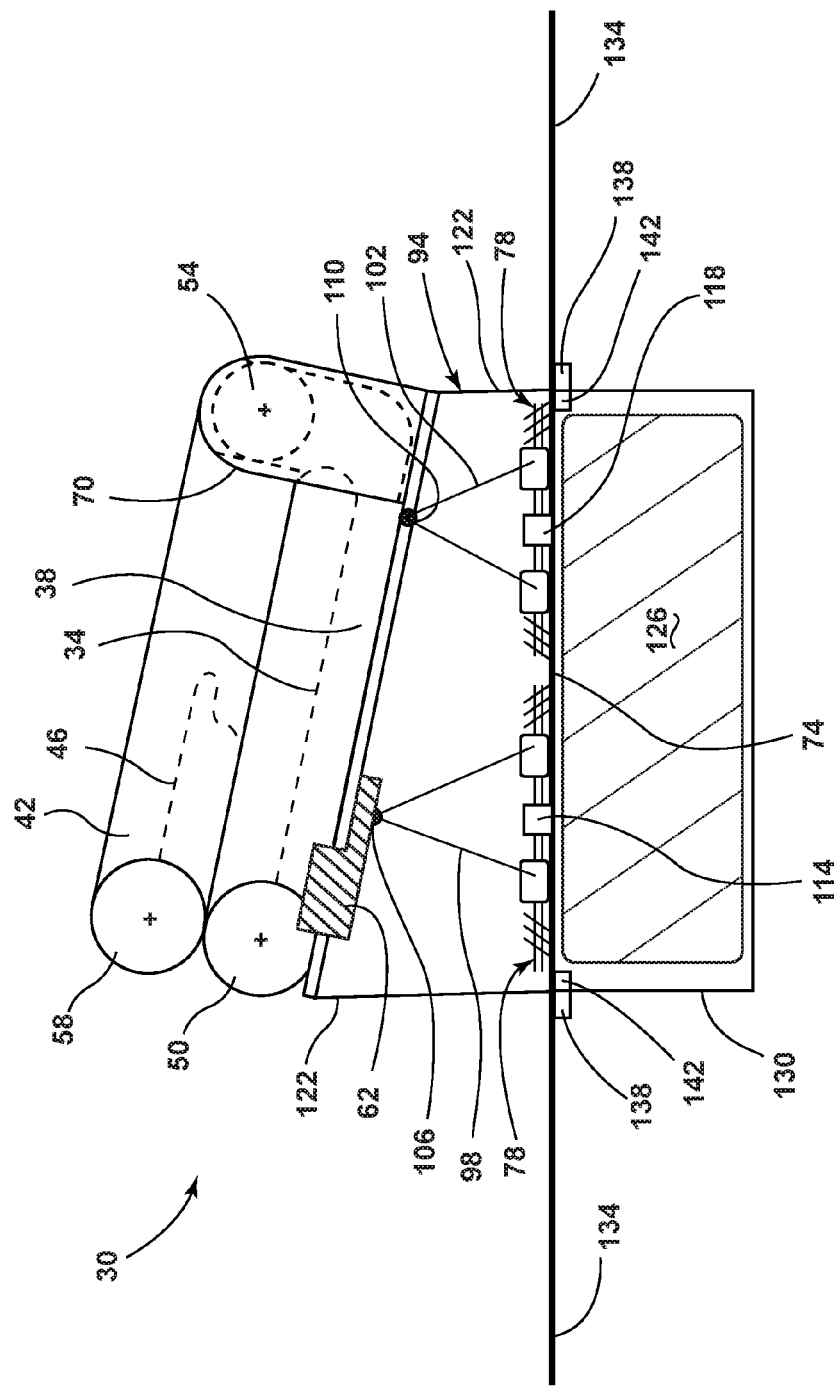
FIG. 3 is a side view of one embodiment of the vehicle seating assembly in a closed configuration.

Referring now to FIGS. 2 and 3, an additional embodiment of the vehicle seating assembly 30 is shown. The inflatable members 82 (FIG. 1) have been deflated. After deflating the inflatable member 82, the vehicle seating assembly 30 can be articulated to a number of configurations. These configurations include, but are not limited to, an open configuration (FIG. 2) and a closed configuration (FIG. 3). In the present embodiment the base assembly 94 includes the front latch 62 releasably coupling the seat 38 to the carrier plate 66 in a front region of the carrier plate 66. The anchor member 70 operably couples the seatback rotational member 54 to the carrier plate 66 in a manner that permits rotation of the seatback rotational member 54 and articulation of both the seat 38 and the seatback 42. Additionally, the base assembly 94 includes the lift mechanism 78. The lift mechanism 78 includes a first lift jack 98 and a second lift jack 102. The first lift jack 98 is operably coupled to an underside of the carrier plate 66 in the front region of the carrier plate 66 by a first pivotable member 106. The second lift jack 102 is operably coupled to the underside of the carrier plate 66 in a rear region of the carrier plate 66 by a second pivotable member 110. The first and second lift jacks 98, 102 can be any suitable lift jacks including, but not limited to, scissor jacks, piston jacks, bottle jacks, ratchet jacks, mechanical jacks, hydraulic jacks, or the like. The first and second lift jacks 98, 102 are coupled to first and second motors 114, 118, respectively, at a lower end of the lift mechanism 78. The first and second motors 114, 118 can be any suitable motor, as will be understood by one of skill in the art. For example, the first and second motors 114, 118 can be screw-drive motors, single-ended drive motors, dual-ended drive motors, etc.

Referring further to FIGS. 2 and 3, a skirt 122 can be coupled to, and extend downward from, the carrier plate 66. The skirt 122 can serve multiple purposes. For example, the skirt 122 can protect the lift mechanism 78 from dust and debris that can interfere with the operation of the lift mechanism 78. Additionally, the skirt 122 can protect users of the vehicle seating assembly 30 from the moving parts of the lift mechanism 78 and thereby reduce pinching and/or crushing hazards. In alternative embodiments the skirt 122 can be foregone. In such an alternative embodiment, the positioning of the lower leg support 34 and/or the carrier plate 66 can serve as protective barriers for the lift mechanism 78 and users of the vehicle seating assembly 30. An elevating system 126 is positioned below and operably coupled to the elevating platform 74. The elevating system 126 is positioned within a compartment 130 in a floor 134 of a vehicle. The compartment 130 is positioned below the vehicle seating assembly 30. The elevating system 126 is discussed in further detail below. The compartment 130 can be equipped with a first plurality of locks 138 located at an upper portion of the compartment 130. The first plurality of locks 138 are configured to lock the elevating platform 74 in an elevated position when the vehicle seating assembly 30 is presented in a raised position by engaging with a plurality of corner locks 142 located on the elevating platform 74. The interaction between the first plurality of locks 138 and the corner locks 142 is sufficient to prevent undesired movement of the vehicle seating assembly 30 during impact events, such as vehicle collisions.

Figure 4:
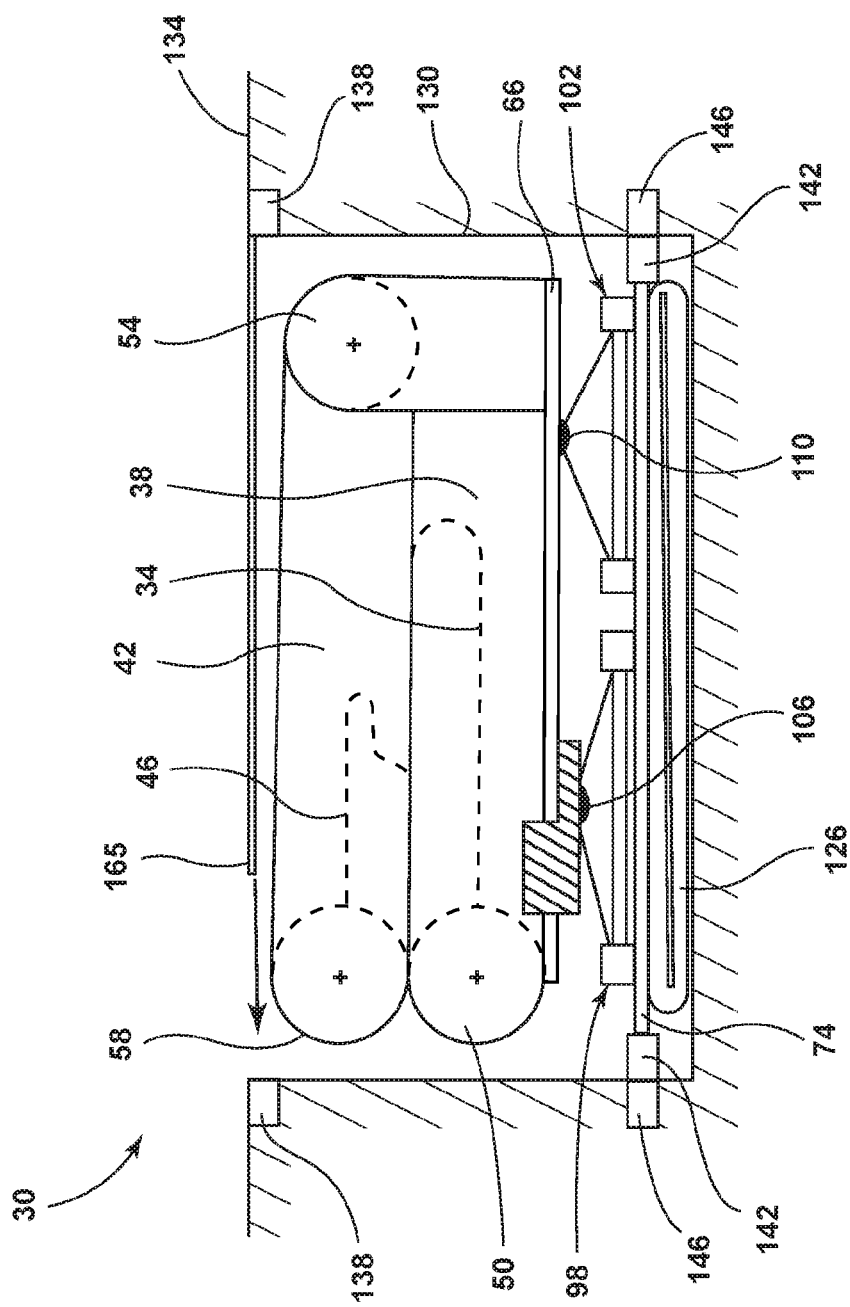
FIG. 4 is a side view of one embodiment of the vehicle seating assembly in a stowed configuration.

Referring now to FIG. 4, the vehicle seating assembly 30 is shown in a stowed configuration. Once the inflatable members 82 (FIG. 1) have been deflated the stowed configuration is accomplished by first articulating the vehicle seating assembly 30 from the open configuration (FIG. 2) to the closed configuration (FIG. 3). The articulation from the open configuration to the closed configuration is accomplished by first activating either or both of the seat rotational member 50 and the headrest rotational member 58 to induce articulation of the lower leg support 34 and/or the headrest 46 toward the seat 38 and/or the seatback 42, respectively. Once the lower leg support 34 and the headrest 46 are in their closed configuration the seat 38 and the seatback 42 are articulated to their closed configuration. To close the seat 38 and the seatback 42 the seatback rotational member 54 is activated to induce articulation of the seatback 42 toward the seat 38, thereby providing the seat 38 and seatback 42, and indeed the vehicle seating assembly 30 as a whole, in the closed configuration. Once in the closed configuration the stowed configuration is accomplished by first leveling and/or lowering the carrier plate 66, the first lift jack 98, and/or the second lift jack 102. Following, or simultaneous to, the leveling and/or lowering of the carrier plate 66, the first lift jack 98, and/or the second lift jack 102, the interaction between the first plurality of locks 138 and the corner locks 142 is disengaged. The elevating platform 74 is then lowered by the elevating system 126 and the corner locks 142 can engage with a second plurality of locks 146 located at a lower portion of the compartment 130. Once the vehicle seating assembly 30 has been lowered into the compartment 130, a cover 165, which is retractably coupled to the floor 134 of the vehicle, can be extended over the compartment 130 to conceal and protect the vehicle seating assembly 30 while the vehicle seating assembly 30 is in the stowed configuration.

Figure 5:
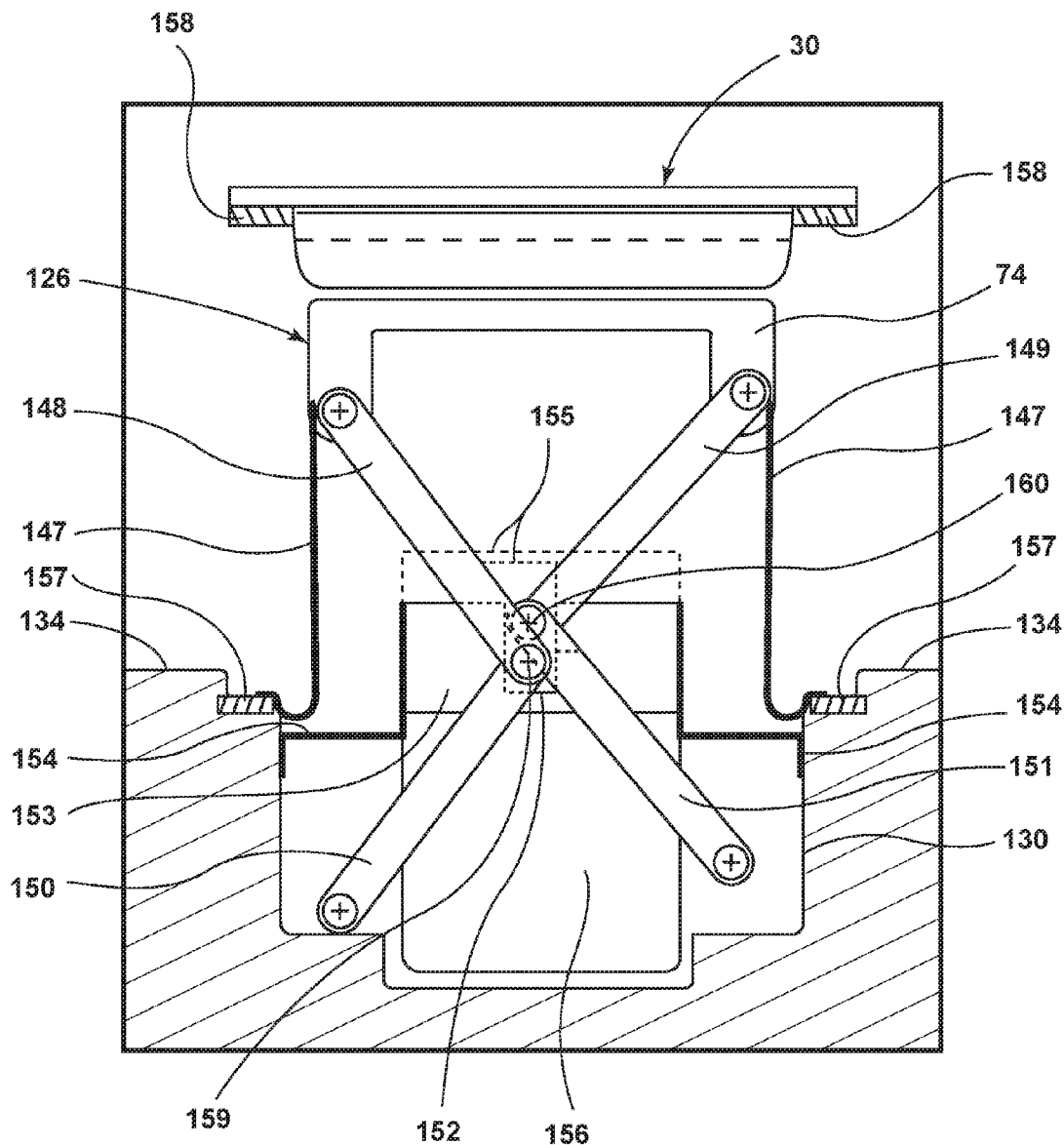
FIG. 5 is a side view of one embodiment of an elevating system providing a raised position for the vehicle seating assembly.

Referring to FIG. 5, one embodiment of the elevating system 126 is shown in a raised position in further detail. The vehicle seating assembly 30 is shown in the closed configuration. A flexible closure 147 is operably coupled to the floor 134 and the elevating platform 74. The flexible closure 147 extends downward from the elevating platform 74 to the floor 134. The flexible closure 147 fully seals the compartment 130 in a waterproof manner, such that the interior of the vehicle can be autonomously cleaned without damaging the elevating system 126. The elevating platform 74 is operably coupled to the elevating system 126 by a front upper linkage 148 and a rear upper linkage 149. The front upper linkage 148 is operably coupled to a front lower linkage 150 and the rear upper linkage 149 is operably coupled to a rear lower linkage 151. The front and rear lower linkages 150, 151 are each operably coupled to the compartment 130 in the floor 134 of the vehicle. The front upper linkage 148 and the front lower linkage 150 are operably coupled within a well 152 of a locking plate 153. The rear upper linkage 149 and the rear lower linkage 151 are operably coupled within the well 152 of the locking plate 153. Operably coupled to the front and rear of the locking plate 153 are lateral stabilizers 154. A plurality of restraining bars 155 are operably coupled to the locking plate 153 and are positioned to guide the front and rear linkage sets as they are articulated. The lateral stabilizers 154, the well 152 in the locking plate 153, and the restraining bars 155 prevent the elevating system 126 from becoming misaligned.

Referring further to FIG. 5, an air bladder 156 is operably coupled to the locking plate 153. The air bladder 156 is positioned below the locking plate 153 and is configured to raise and lower the locking plate 153, which in turn raises and lowers the elevating system 126. The floor 134 of the vehicle can be equipped with a first set of floor seal members 157 and the closed configuration of the vehicle seating assembly 30 can provide a second set of floor seal members 158. The second set of floor seal members 158 can be separate components from the vehicle seating assembly 30 that are operably coupled to the vehicle seating assembly 30. Alternatively, the second set of floor seal members 158 can be integral to the vehicle seating assembly 30, such as an edge of the vehicle seating assembly 30 or an over-hanging structure that is configured to match the opening of the compartment 130.

Referring again to FIG. 5, the vehicle seating assembly 30 is transitioned from the raised position to the lowered position by first removing air from the air bladder 156. The air removal from the air bladder 156 can be accomplished, for example, by opening vents in the air bladder 156 or by evacuating the air with a pump or vacuum. As the air bladder 156 deflates the locking plate 153 is lowered, which lowers front and rear linkage joints 159, 160. At a point along the travel of the lowering locking plate 153, the front and rear linkage joints 159, 160 rise out of the well 152 in the locking plate 153. As the front and rear linkage joints 159, 160 exit the well 152 in the locking plate 153 the restraining bars 155 guide the front and rear linkage joints 159, 160, and any associated cross bars or stub shafts, downward toward the surface of the locking plate 153. Once out of the well 152 of the locking plate 153, the front and rear linkage joints 159, 160, which can include cross bars or stub shafts, can move laterally along the surface of the locking plate 153. As the front and rear linkage joints 159, 160 diverge, the front and rear linkage sets are driven to collapse and lower the vehicle seating assembly 30 toward the stowed configuration. The downward force provided by the lowered elevating system 126 secures the back of the vehicle seating assembly 30 flush with the floor 134 of the vehicle.

Figure 6:
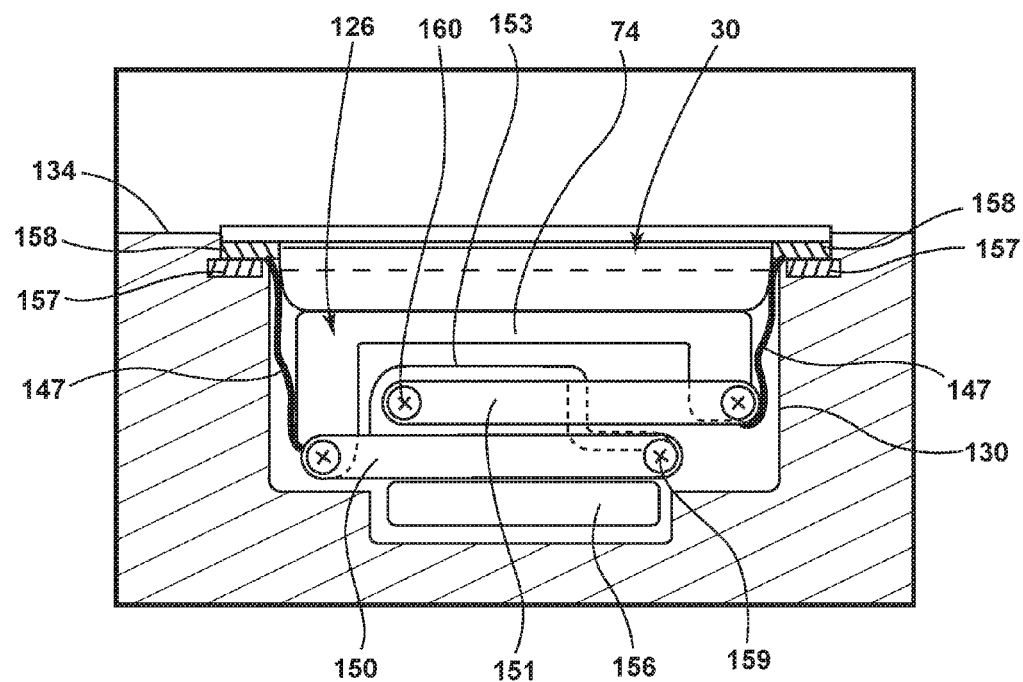
FIG. 6 is a side view of the elevating system, similar to FIG. 5, providing a lowered position for the vehicle seating assembly.

Referring now to FIG. 6, one embodiment of the elevating system 126 is shown in a lowered position in further detail. The vehicle seating assembly 30 is shown in the stowed configuration. The first and second set of floor seal members 157, 158 interact with one another to seal the compartment 130 in the floor 134 from dust and debris. The locking plate 153 is nested within and/or below the elevating platform 74. The front upper linkage 148 nests within the front lower linkage 150 when in the lowered position. The rear upper linkage 149 nests within the rear lower linkage 151 when in the lowered position. The air bladder 156 has been placed in a collapsed or deflated state. The flexible closure 147 extends downward into the compartment 130 in the floor 134. In some embodiments, the lowering of the vehicle seating assembly 30 into the compartment 130 can be an initial step in an automated cleaning procedure of the interior of the vehicle. The automated cleaning procedure can include power washing the interior of the vehicle.

Referring further to FIG. 6, the vehicle seating assembly 30 is transitioned from the lowered position to the raised position by first providing air to the air bladder 156. As the air bladder 156 inflates, the locking plate 153 pushes upward against the front and rear linkage joints 159, 160, and any associated cross bars or stub shafts. As the front and rear linkage joints 159, 160 rise, the front and rear linkage sets are driven to extend and raise the vehicle seating assembly 30 from the stowed configuration to the closed configuration. While the front and rear linkage joints 159, 160 rise, the front and rear linkage joints 159, 160 converge on the well 152 (FIG. 5) in the locking plate 153. At a point along the travel of the raising locking plate 153 the cross bars and/or stub shafts reach the well 152 in the locking plate 153 and fall into the well 152. As the air bladder 156 continues to inflate the front and rear linkage sets will reach a maximum range of travel and the raising motion will cease.

Figure 7:
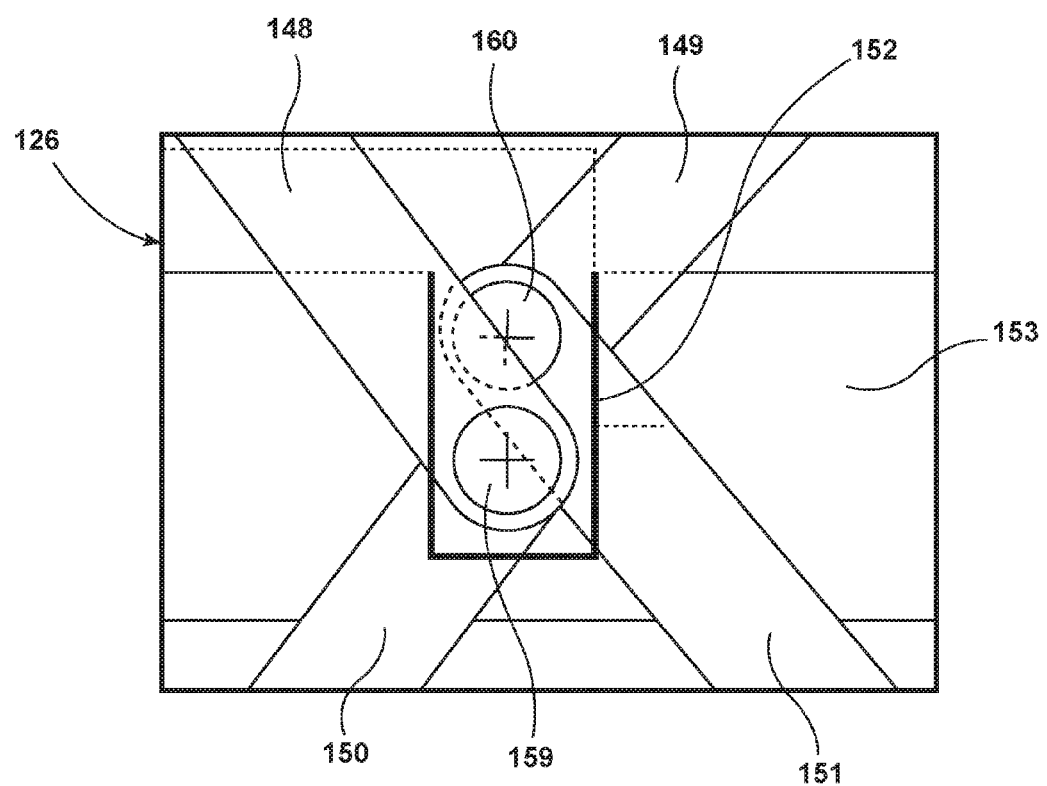
FIG. 7 is an expanded side view of a well in a locking plate of the elevating system.

Referring to FIG. 7, a close up view of the well 152 in the locking plate 153 is shown. The front linkage joint 159 and the rear linkage joint 160 of the elevating system 126 are positioned within the well 152 of the locking plate 153. In some embodiments the elevating system 126 utilizes a duplicate set of front upper and front lower linkages 148, 150 and a duplicate set of rear upper and rear lower linkages 149, 151. That is, there are a total of four linkage sets employed by the elevating system 126 with the left side and the right side of the elevating system 126 being symmetrical. When the four linkage sets are employed a cross bar operably couples the front linkage sets together and a separate cross bar operably couples the rear linkage sets together. In the embodiments that utilize the cross bars, the crossbars couple to the linkage sets at the front and rear linkage joints 159, 160. Additionally, the cross bars rest in the well 152 of the locking plate 153 when in the raised position.

Figure 8:
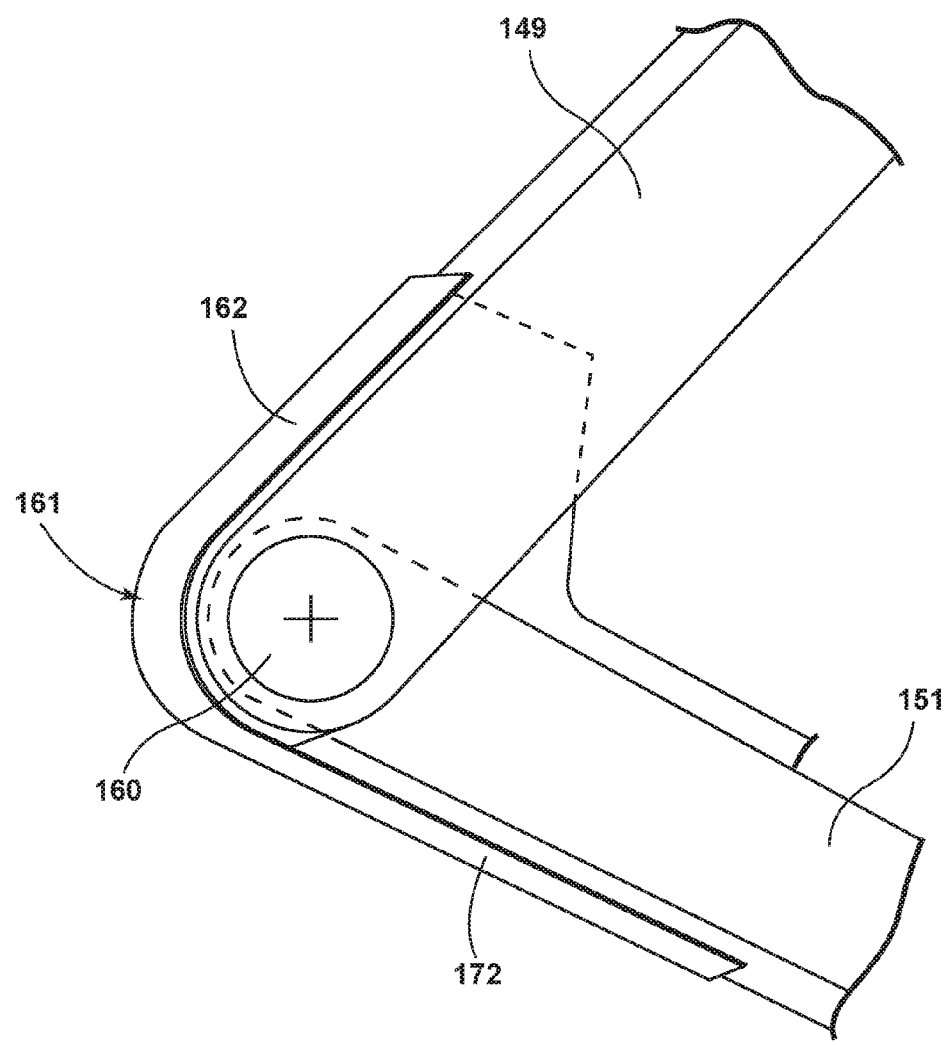
FIG. 8 is an expanded side view of a bracket of the elevating system.

Referring now to FIG. 8, a close up view of the rear linkage joint 160 is shown. The rear linkage joint 160 includes a bracket 161 having a max height stop 162 and a minimum height stop 172. As the elevating system 126 raises the vehicle seating assembly 30, the rear linkage joint 160 is raised. As the rear linkage joint 160 is raised, the rear upper linkage 149 and rear lower linkage 151 travel within the bracket 161.

Figure 9:
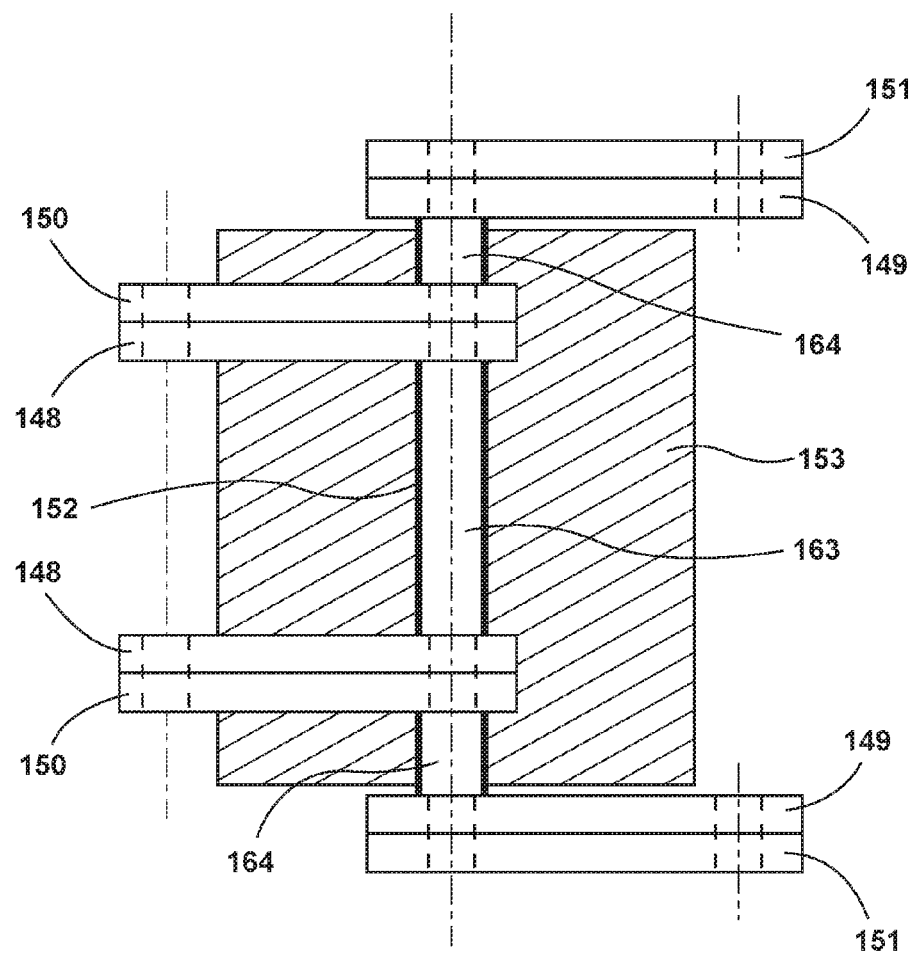
FIG. 9 is a top view of the locking plate of the elevating system in the raised position.

Referring to FIG. 9, a top view of the locking plate 153 in the raised position is shown. The front upper linkages 148 and front lower linkages 150 are operably coupled. A front cross bar 163 operably couples the front linkage set together to ensure synchronized raising and lowering. The rear upper linkages 149 and the rear lower linkages 151 are operably coupled together. A rear cross bar 164, or stub shaft, operably couples the rear linkage set together to ensure synchronized raising and lowering. The front and rear cross bars 163, 164 are positioned within the well 152 in the locking plate 153. In alternate embodiments, the front and/or rear cross bars 163, 164 can be stub shafts that do not operably couple the front linkage sets and rear linkage sets together, respectively, as shown in FIG. 10.

Figure 10:
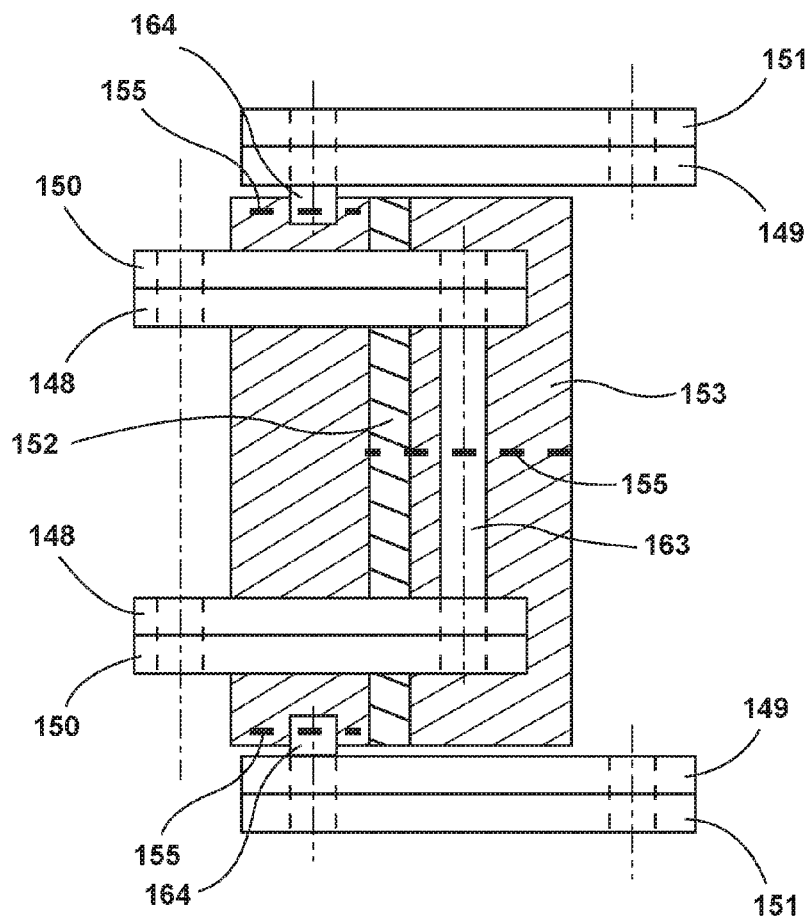
FIG. 10 is a top view of the locking plate of the elevating system, similar to FIG. 9, in the lowered position.

Referring now to FIG. 10, a top view of the locking plate 153 in the lowered position is shown. The front upper linkages 148 and front lower linkages 150 are operably coupled together. The front cross bar 163 operably couples the front linkage set together to ensure synchronized raising and lowering. The rear upper linkages 149 and the rear lower linkages 151 are operably coupled by stub shafts that take the place of the rear cross bar 164. When in the lowered position the front and rear cross bars 163, 164 can be positioned out of the well 152 in the locking plate 153. As the front and rear cross bars 163, 164 exit the well 152 the restraining bars 155 guide the front and rear cross bars 163, 164 downward and allow them to spread apart to the front and rear of the locking plate 153, respectively.

Figure 11:
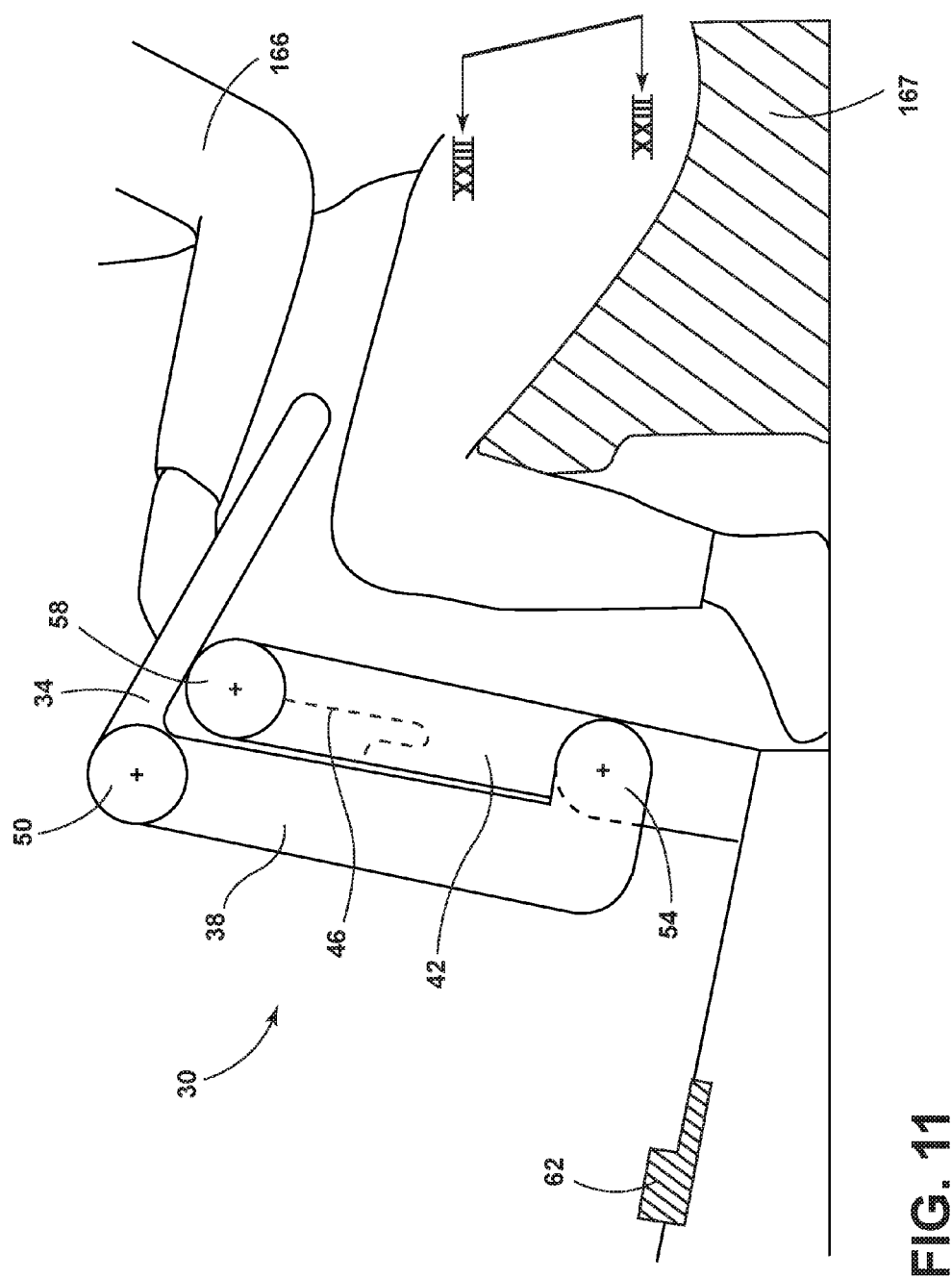
FIG. 11 is a side view of one embodiment of the vehicle seating assembly in a desk configuration.

Referring to FIG. 11, an additional embodiment of the vehicle seating assembly 30 is shown, which includes the lower leg support 34, the seat 38, the seatback 42, and optionally the headrest 46. The vehicle seating assembly 30 is shown in a desk configuration, which is presented to an occupant 166 of a rear seating assembly 167. Articulating the vehicle seating assembly 30 from a first configuration, such as the open configuration, to the desk configuration begins with disengaging the interaction between the front latch 62 and the seat 38. After disengaging the front latch 62, the seatback rotational member 54 is activated to articulate the seat 38 in a clockwise fashion toward the seatback 42. Following, or simultaneous to, the articulation of the seat 38 toward the seatback 42, the seat rotational member 50 is activated to articulate the lower leg support 34 in a clockwise fashion, such that an underside of the lower leg support 34 is presented to the occupant 166 of the rear seating assembly 167. The underside of the lower leg support 34 then becomes a working surface for the occupant 166, similar to a desk. In embodiments that include the headrest 46, the headrest rotational member 58 is activated to articulate the headrest 46 in a counter-clockwise fashion to nest within the recess 86 (FIG. 1) of the seatback 42 prior to the seat 38 fully articulating toward the seatback 42. One of skill in the art will recognize that the articulation of various components can occur in various orders or at the same time so long as adequate clearance is maintained between the articulating components.

Figure 12:
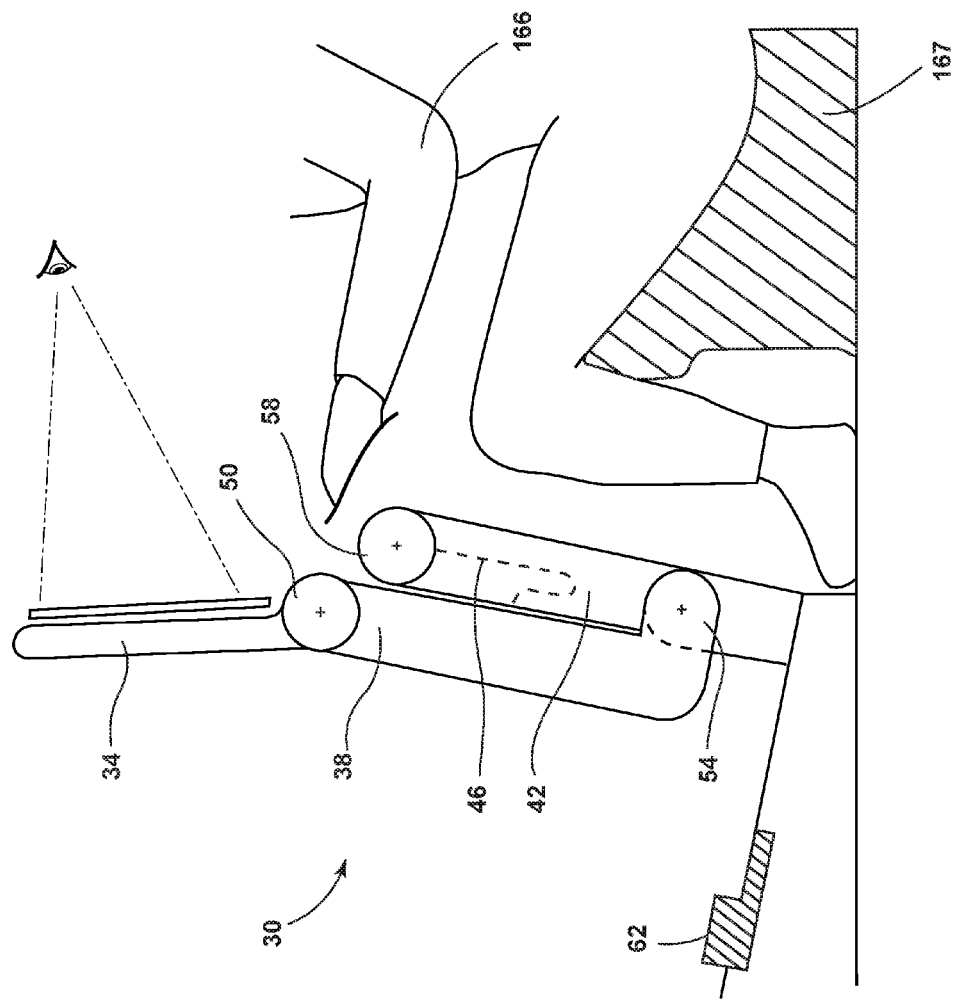
FIG. 12 is a side view of one embodiment of the vehicle seating assembly in a projection surface configuration.

Referring now to FIG. 12, the vehicle seating assembly 30 is shown in a projection surface configuration. In the projection surface configuration the lower leg support 34 provides the surface that can be projected upon. That is, the fabric of the inflatable member 82 (FIG. 1) can be used as a projection screen while the vehicle seating assembly 30 is in the projection surface configuration. Alternatively, a multi-media screen, such as an LCD or LED screen, can be positioned in the lower leg support 34, such that when the vehicle seating assembly 30 is in the projection surface configuration, the multi-media screen in the lower leg support 34 is presented to the rear seating assembly 167 occupant 166 for viewing. In this embodiment the headrest 46 can be rotated counter-clockwise such that the headrest 46 nests within the recess 86 (FIG. 1) of the seatback 42, as shown. Alternatively, the headrest 46 can be rotated clockwise to present the rear seating assembly 167 occupant 166 with a working surface, a place to rest their hands/arms, and/or a padded surface (e.g. the headrest 46 inflatable member 82 in the inflated state) to rest on. To transition to the projection surface configuration from, for example, the open configuration, the seat 38 is rotated clockwise by the seatback rotational member 54 and the headrest 46 can be rotated counter-clockwise or clockwise to nest the headrest 46 within the recess 86 of the seatback 42 or present the headrest 46 to the occupant 166 of the rear seating assembly 167, respectively. In embodiments where the front latch 62 is used, the front latch 62 is disengaged from its interaction with the seat 38 prior to articulation of the seat 38 by the seatback rotational member 54. The occupant 166 of the rear seating assembly 167 can adjust the angle of the lower leg support 34 when the vehicle seating assembly 30 is in the projection surface configuration to customize their viewing angle of the lower leg support 34.

Figure 13:
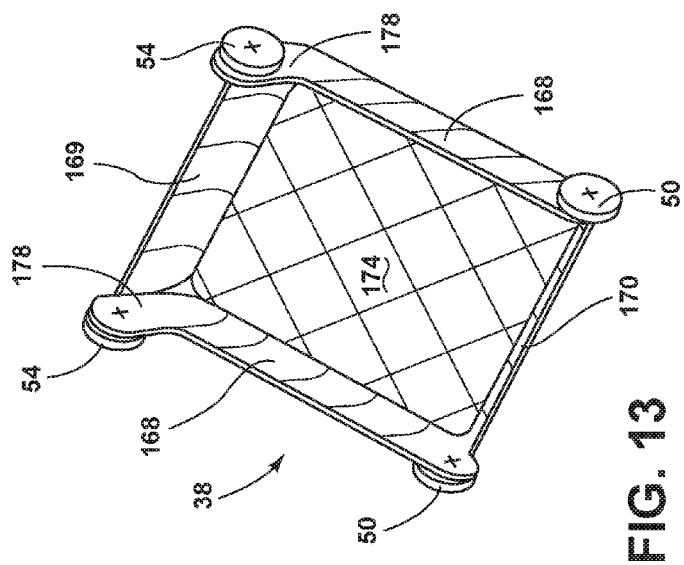
FIG. 13 is a top perspective view of one embodiment of a seat of the vehicle seating assembly.

Referring to FIG. 13, a top perspective view of one embodiment of the seat 38 is shown. The seat 38 can be made of a composite material, such as fiberglass, polymers, carbon fiber, and the like. Further, the seat 38 can be integrally formed, modularly formed, or a combination thereof. The structure of the seat 38 includes side walls 168, a rear wall 169, a front wall 170, a seat support surface 174, a plurality of upward extending members 178, the seat rotational member 50, and the seatback rotational member 54. The plurality of upward extending members 178 extend upward from the side walls 168 a first distance above the seat support surface 174. The upper extreme of the rear wall 169 extends a second distance above the seat support surface 174. The upper extreme of the side walls 168 extends a third distance above the seat support surface 174. The upper extreme of the front wall 170 extends a fourth distance above the seat support surface 174. In some embodiments, the first, second, third, and fourth distances are equal. In other embodiments, the first, second, third, and fourth distances are not equal. For example, the first distance can be greater than the second distance, the second distance can be greater than the third distance, and the third distance can be greater than the fourth distance. The seatback rotational member 54 can be located on one or more of the plurality of upward extending members 178. The seat rotational member 50 can be located at a front end of one or both of the side walls 168. While shown as independently coupled to the seat 38, the seat rotational members 50 and the seatback rotational members 54 can be operably coupled to one another by a coupling member, such as a rod.

Figure 14A:
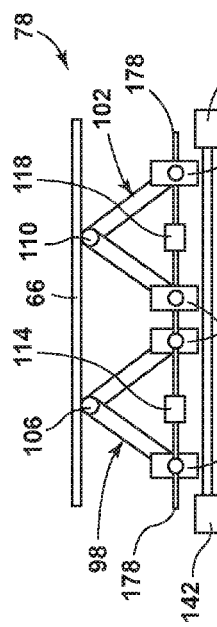
FIG. 14A is a side view of one embodiment of the lift mechanism in a first position.
Figure 14B:
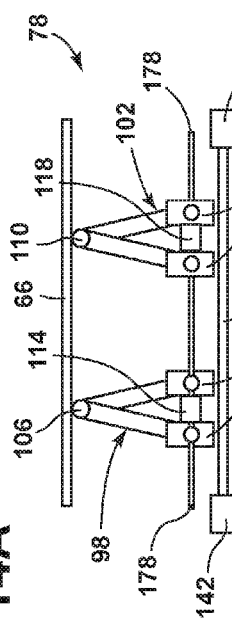
FIG. 14B is a side view of one embodiment of the lift mechanism in a second position.

Referring now to FIGS. 14A and 14B, a side view of the lift mechanism 78 is shown in a first position (FIG. 14A) and a second position (FIG. 14B), according to one embodiment of the lift mechanism 78. The carrier plate 66 is operably coupled to the first and second pivotable members 106, 110, which are in turn operably coupled to the first and second lift jacks 98, 102, respectively. The first and second lift jacks 98, 102 are operably coupled to drive shafts 180 by couplers 182. The drive shafts 180 of the first and second lift jacks 98, 102 are equipped with the first and second motors 114, 118, respectively. The elevating platform 74 is positioned below the lift mechanism 78 and operably couples to the lift mechanism 78 in a manner that permits movement of the couplers 182 along the drive shafts 180. The elevating platform 74 is equipped with the corner locks 142 positioned at each of the corners of the elevating platform 74.

Figure 15:
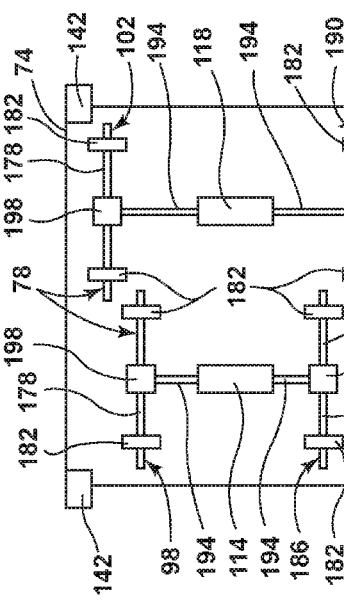
FIG. 15 is a top plan view of an elevating platform of the elevating system.

Referring to FIG. 15, a top plan view is shown of the elevating platform 74 equipped with the lift mechanism 78 and corner locks 142, according to one embodiment of the present disclosure. In the embodiment shown, the lift mechanism 78 includes the first lift jack 98, the second lift jack 102, a third lift jack 186, and a fourth lift jack 190. In the embodiment shown the first, second, third, and/or fourth lift jacks 98, 102, 186, 190 can be operated in unison or independently to provide multi-axis tilting of the vehicle seating assembly 30. The first and second motors 114, 118 are dual-ended motors in this embodiment. The first and second motors 114, 118 include drive pinions 194 that are operably coupled to the drive shafts 180 by transmission members 198. The transmission members 198 transmit linear motion in one direction into linear motion in a non-parallel direction, such as a perpendicular direction. By using dual-ended motors, the first and second motors 114, 118 can drive a total of four drive shafts 180. An example of such a dual-ended motor setup is the use of screw jacks that have opposing threads. The couplers 182 can travel between one end of the associated drive shaft 178 and a mid-point of the associated drive shaft 178.

Referring now to FIGS. 16 and 17, a cross-sectional view of one embodiment of a powered puck 199, taken along line XVI-XVI of FIG. 1, is shown. The powered puck 199 can be used as the seat rotational member 50, the seatback rotational member 54, and/or the headrest rotational member 58. The powered puck 199 is operably and/or rotatably coupled to the support structure(s) that is/are acted on. The support structure can be, for example, the lower leg support 34, the seat 38, the seatback 42, and/or the headrest 46. The powered puck 199 is provided with a locking unit 200 that can lock the support structure(s) in the configuration or position that the vehicle seating assembly 30 has been articulated to. For example, the locking unit 200 can be used to lock the vehicle seating assembly 30 in a reclined configuration. A planetary gearbox 201 is operably coupled to the locking unit 200. An electric motor, such as a pancake motor 202, is operably coupled to the planetary gearbox 201 by a drive cylinder 203.

Referring further to FIGS. 16 and 17, the planetary gearbox 201 includes an outer shell gear 204, planetary gears 205, and a sun gear 206. The sun gear 206 is operably coupled to the drive cylinder 203. The drive cylinder 203 terminates within the pancake motor 202 and includes a disk 207 operably coupled to the drive cylinder 203. The disk 207 extends radially outward from the drive cylinder 203 and is positioned between electric stator coils 208 of the pancake motor 202. Upon activation of the pancake motor 202 the electric stator coils 208 are energized and induce rotation of the disk 207, which in turn rotates the drive cylinder 203. The rotation of the drive cylinder 203 is transmitted to the sun gear 206, which transmits the rotational motion to the planetary gears 205 and ultimately the outer shell gear 204. The rotational motion of the outer shell gear 204 articulates the associated support structure(s) of the vehicle seating assembly 30, which results in the transitions between the various configurations disclosed. While the planetary gearbox 201 has been described with the rotational input from the drive cylinder 203 acting directly on the sun gear 206, it is contemplated that the planetary gearbox 201 can be alternatively arranged. For example, the planetary gearbox 201 can accept rotational input from the pancake motor 202 at the outer shell gear 204, the planetary gears 205, and/or the sun gear 206. Similarly, rotational output from the planetary gearbox 201 can be transmitted by the outer shell gear 204, the planetary gears 205, and/or the sun gear 206. The choice of which portion of the planetary gearbox 201 accepts rotational input and which portion transmits rotational output is chosen based on various design incentives and factors, such as the reduction ratio.

Referring again to FIGS. 16 and 17, the powered puck 199 is equipped to receive electrical power from a power supply, such as a vehicle power source. The powered puck 199 can be equipped with a rotational counter that monitors the degrees of rotation that the powered puck 199 has effected. The rotational counter can differentiate between receiving a positive or negative power signal. The positive and negative power signals dictate whether the powered puck 199 rotates clockwise or counter-clockwise. The rotational counter status can be compared to a target counter status that corresponds to predetermined degrees of rotation for transitioning between the various configurations disclosed herein. If the actual counter status is different than the target counter status, then the rotational counter can send a coded electrical position pulse to the comparator power supply to remedy the difference. The command to the power supply can be an electrical pulse, such as a coded electrical pulse. The coded position pulse and/or comparator controls the corrective rotation of the powered puck 199.

Turning now to FIGS. 18-27, the inflatable member 82 for the vehicle seating assembly 30 is shown in further detail. The inflatable member 82 includes an upper sheet 209 and a lower sheet 212. A fluid delivery assembly 214 is positioned at intervals between the upper sheet 209 and lower sheet 212. The inflatable member 82 further includes a plurality of fluid cells 218 defined by a series of ridges 222 formed by the lower sheet 212. The series of ridges 222 sealably couple to at least one of an underside of the fluid delivery assembly 214 and the upper sheet 209. The plurality of fluid cells 218 are provided with fluid from the fluid delivery assembly 214. A support structure 226 abuts an underside of the lower sheet 212.

Figure 18:
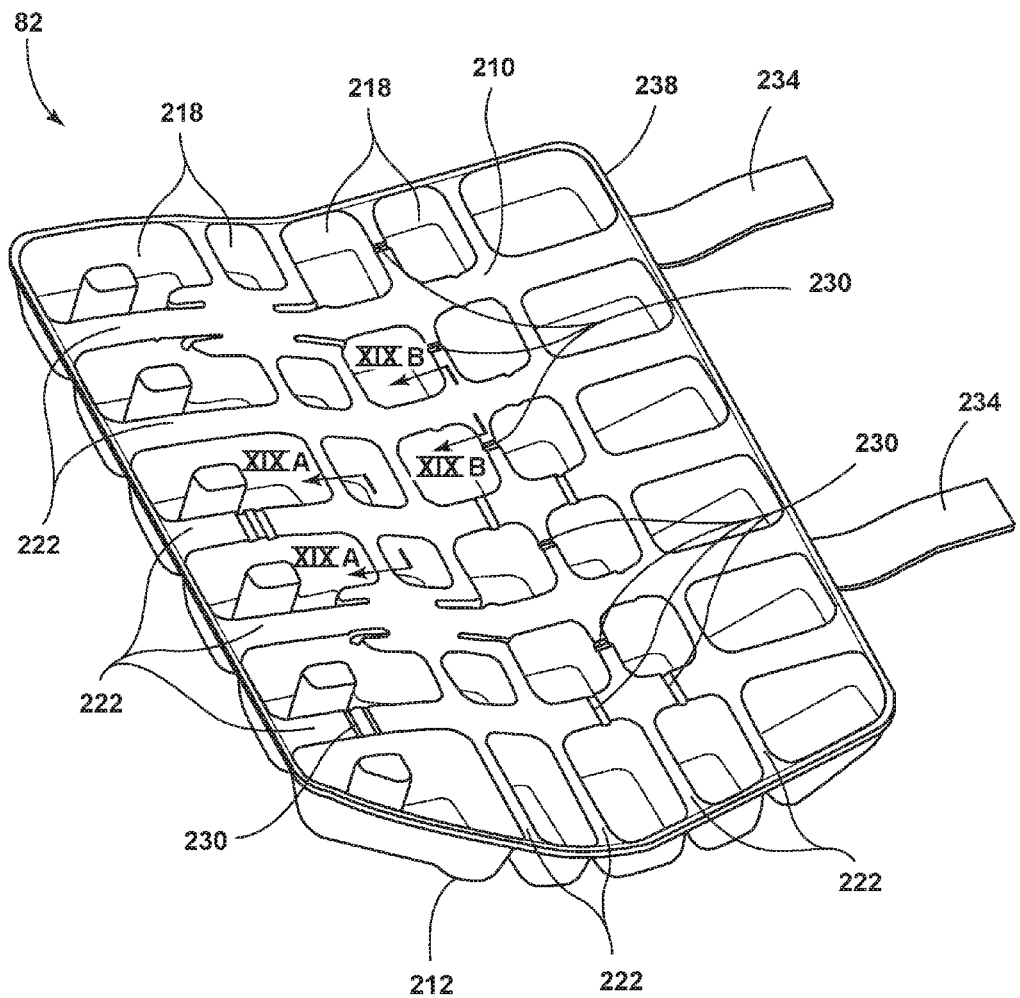
FIG. 18 is a top perspective view of one embodiment of the inflatable members.

Referring further to FIG. 18, one embodiment of the inflatable member 82 is shown from a top perspective view in further detail. The lower sheet 212 defines the series of ridges 222 and the series of ridges 222 further define the plurality of fluid cells 218. The plurality of fluid cells 218 can be various shapes and sizes. Additionally, individual fluid cells 218 of the plurality of fluid cells 218 can be in fluid communication with other fluid cells 218 of the plurality of fluid cells 218 via channels 230. The channels 230 allow redistribution of the fluid within the plurality of fluid cells 218 in response to pressure changes between the fluid cells 218 as a result of movements or weight shifting undertaken by the user of the inflatable member 82. Alternatively, the channels 230 can be used to provide recessed portions of the inflatable member 82 where the fluid delivery assembly 214 is positioned, such that the upper sheet 209 (FIG. 19) presents a substantially smooth surface of the inflatable member 82. The inflatable member 82 can be equipped with securing members 234 that can be used to secure the inflatable member 82 to the support structure 226 (FIG. 19). The securing members 234 can be attached to the inflatable member 82 in various ways and at various locations without departing from the concepts disclosed herein. For example, the securing members 234 in the present embodiment extend from a rearward portion 238 of the inflatable member 82. The location and attachment of the securing members 234 to the inflatable member 82 are chosen to be within reach of corresponding securing points on the support structure 226. The securing members 234 can also serve as the entrance and/or carrier of the fluid delivery assembly 214 into the inflatable member 82. Additionally, the securing members 234 can support the capillaries for the fluid supply 246, the inflation members 306, and/or the deflation members 310. Further, the securing members 234 may support the at least one stopcock 294 in embodiments where the at least one stopcock 294 is remotely located with respect to the inflatable member 82. One of skill in the art will recognize that various attachment methods, locations, and quantity of the securing members 234 can be used without departing from the concepts disclosed herein.

Figure 19A:
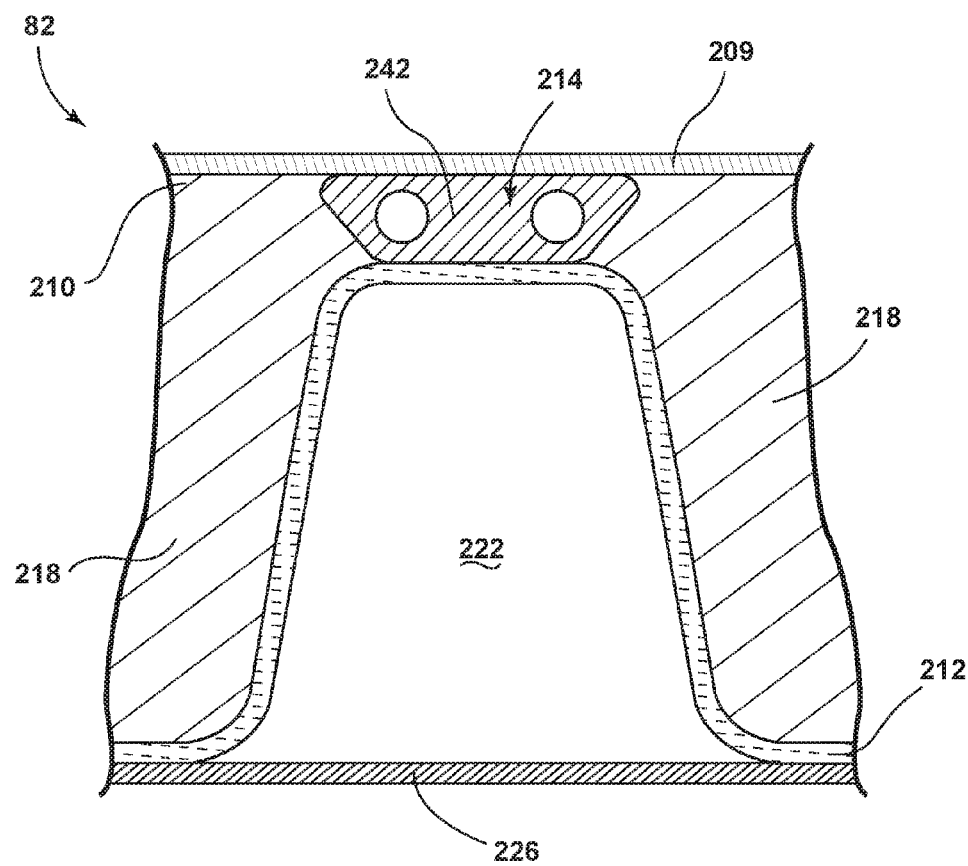
FIG. 19A is a cross-sectional view of one embodiment of the inflatable member taken along line XIXA-XIXA of FIG. 18.
Figure 26:
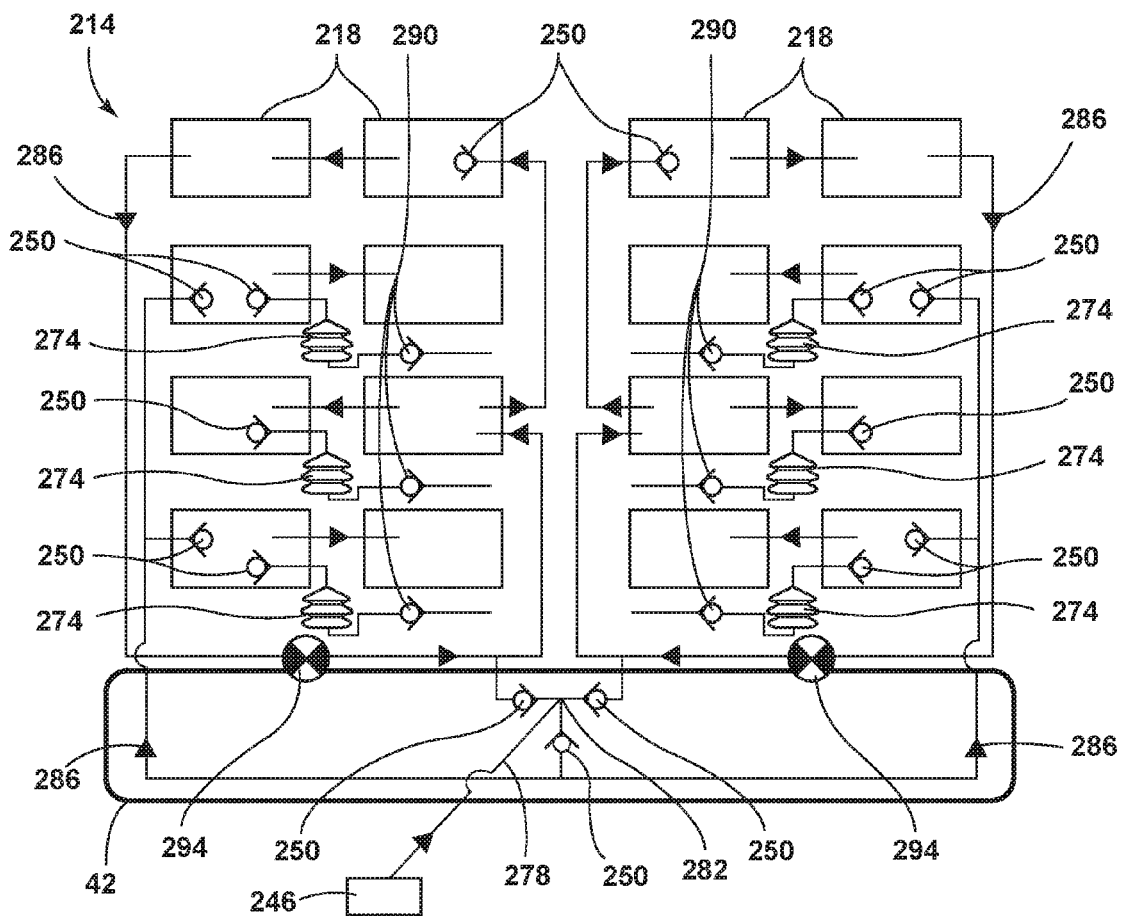
FIG. 26 is a schematic view of one embodiment of a fluid delivery assembly.

Referring now to FIG. 19A, the fluid delivery assembly 214 is positioned at intervals between the upper sheet 209 and the lower sheet 212. The fluid delivery assembly 214 can be positioned between the upper and lower sheets 209, 212 such that the fluid delivery assembly 214 corresponds with the series of ridges 222 in the lower sheet 212. The fluid delivery assembly 214 can include capillary extrusions, such as a dual capillary extrusion 242, that act as main arteries that supply fluid from a fluid supply 246 (FIG. 26) to a network of check valves 250 (FIG. 26). The network of check valves 250 are in fluid communication with the main arteries and the plurality of fluid cells 218. The network of check valves 250 is configured to associate the check valves 250 with at least some of the fluid cells 218 and control the pressure within the fluid cells 218. The lower sheet 212 sealably engages with the underside of the fluid delivery assembly 214 at an upper portion of the series of ridges 222, thereby defining the plurality of fluid cells 218 between the upper sheet 209 and the lower sheet 212. The support structure 226 abuts an underside of the lower sheet 212. The support structure 226 can be various structures. For example, the support structure 226 can be the floor 134, the lower leg support 34, the seat 38, the seatback 42, and/or the headrest 46. The support structure 226 can alternatively be a local bridge structure that extends across the bottom or underside of the series of ridges 222. In such embodiments, the local bridge feature can be integral with the inflatable member 82 and positioned beneath the at least one bellows 274. Additionally, in embodiments where the local bridge feature is operably coupled to an underside of the at least one bellows 274, when the vehicle seating assembly 30 is vacated and the upper sheet 209 rises due to the pressure in the fluid cells 218, then the top of the bellows 274 will also rise. As the top of the bellows 274 rises, the underside of the bellows 274 remains stationary since it is operably coupled to the local bridge feature of the lower sheet 212. The rising of the top of the bellows 274 with relation to the bottom or underside of the bellows 274 results in the bellows 274 "inhaling" or filling with fluid through the inlet check valves 290.

Figure 19B:
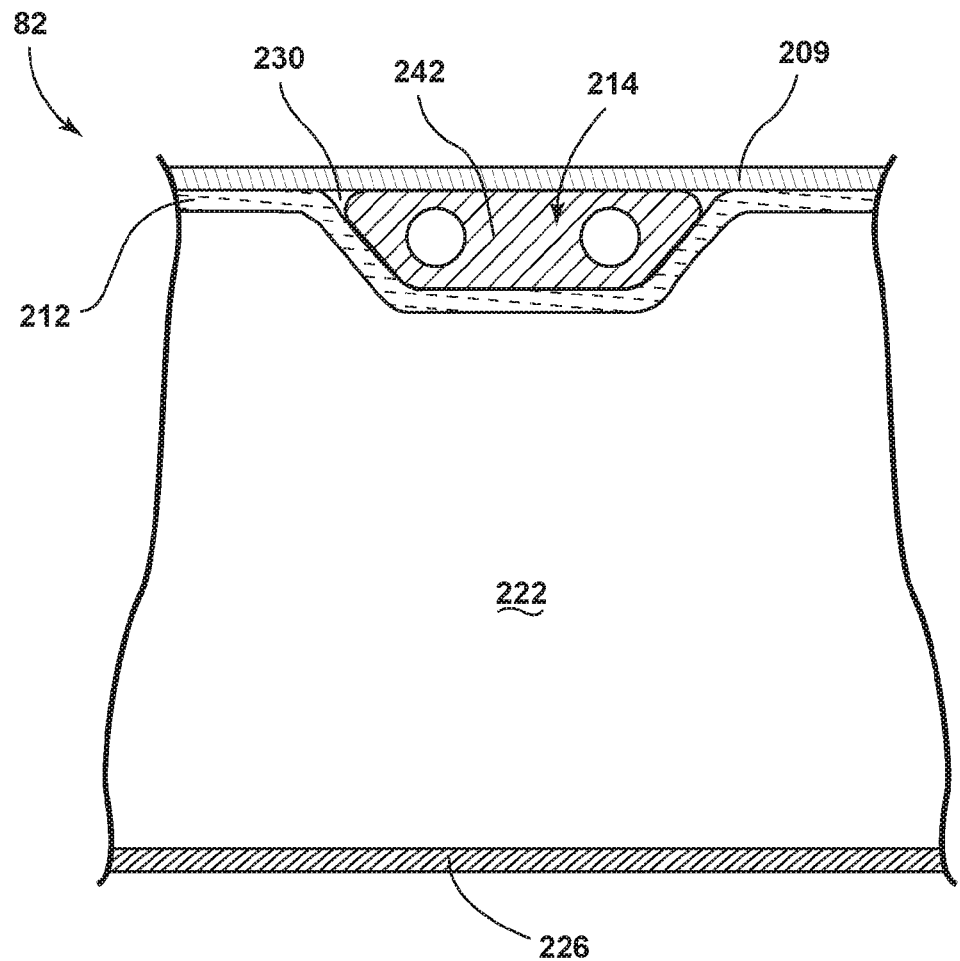
FIG. 19B is a cross-sectional view of the inflatable member taken along line XIXB-XIXB of FIG. 18.

Referring now to FIG. 19B, the fluid delivery assembly 214 is positioned at intervals between the upper sheet 209 and the lower sheet 212. The fluid delivery assembly 214 can be positioned between the upper and lower sheets 209, 212 such that the fluid delivery assembly 214 corresponds with the series of ridges 222 in the lower sheet 212. The fluid delivery assembly 214 can include capillary extrusions, such as the dual capillary extrusion 242, that act as main arteries that supply fluid from a fluid supply 246 (FIG. 26) to a network of check valves 250 (FIG. 26). The network of check valves 250 are in fluid communication with the main arteries and the plurality of fluid cells 218. The network of check valves 250 is configured to associate the check valves 250 with at least some of the fluid cells 218 and control the pressure within the fluid cells 218. The lower sheet 212 sealably engages with the fluid delivery assembly 214 and the upper sheet 209. The fluid delivery assembly 214 and/or the dual capillary extrusions 242 can be positioned in the channels 230. The support structure 226 abuts an underside of the lower sheet 212. The support structure 226 can be various structures. For example, the support structure 226 can be the floor 134, the lower leg support 34, the seat 38, the seatback 42, and/or the headrest 46.

Figure 19C:
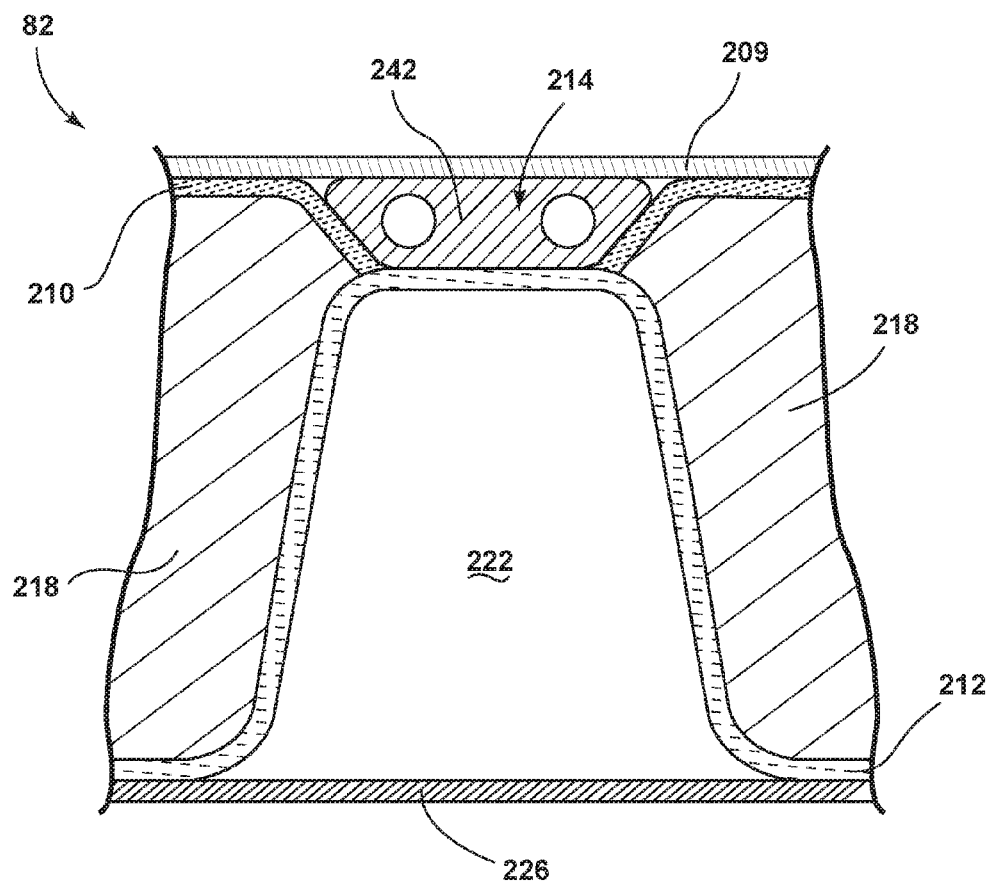
FIG. 19C is a cross-sectional view of another embodiment of the inflatable member taken along line XIXA-XIXA of FIG. 18.

Referring now to FIG. 19C, the fluid delivery assembly 214 is positioned at intervals between the upper sheet 209 and the intermediate sheet 210. The fluid delivery assembly 214 can be positioned between the upper and intermediate sheets 209, 210 such that the fluid delivery assembly 214 corresponds with the series of ridges 222 in the lower sheet 212. The fluid delivery assembly 214 can include capillary extrusions, such as a dual capillary extrusion 242, that act as main arteries that supply fluid from a fluid supply 246 (FIG. 26) to a network of check valves 250 (FIG. 26). The network of check valves 250 are in fluid communication with the main arteries and the plurality of fluid cells 218. The network of check valves 250 is configured to associate the check valves 250 with at least some of the fluid cells 218 and control the pressure within the fluid cells 218. The lower sheet 212 sealably engages with the intermediate sheet 210 at an upper portion of the series of ridges 222, thereby defining the plurality of fluid cells 218 between the intermediate sheet 210 and the lower sheet 212. The support structure 226 abuts an underside of the lower sheet 212. The support structure 226 can be various structures. For example, the support structure 226 can be the floor 134, the lower leg support 34, the seat 38, the seatback 42, and/or the headrest 46.

Referring to FIGS. 20 and 21, FIG. 20 is a top plan view of the fluid cells 218 of the inflatable member 82. FIG. 21 is a cross-sectional view of the fluid cells 218 of the inflatable member 82 taken along the line XXI-XXI of FIG. 20. The imprints of a typical male 254 and a typical female 258 occupant are shown to demonstrate the differences in support requirements for various sizes of occupants. Additionally, the indentation in the fluid cells 218 resulting from a $50^{th}$ percentile adult female 262 and a $120^{th}$ percentile adult male 266 are shown in FIG. 21. The calculations and/or assumptions to determine the various percentiles of adult females and adult males are understood by one of skill in the art and are used in the automotive industry to account for the various sizes of users. The various percentiles of adult females and adult males are not discussed in detail herein. The inflatable member 82 is capable of maintaining the hip point, referred to as h-point, of the occupant of the vehicle seating assembly 30 (FIG. 1) in the proper location to meet federal and state safety requirements. The h-point is the location of the occupant's hip, when seated in the vehicle seating assembly 30, relative to the floor 134 (FIG. 3) of the vehicle (or to the height above the pavement level). The h-point, as generally defined by the Society of Automotive Engineers (SAE), is a mechanically hinged hip point of a three-dimensional manikin (SAE J2826 manikin), which simulates the actual pivot center of a human hip. The h-point can be thought of, roughly, as the hip joint of a $50^{th}$ percentile male occupant, viewed laterally. Additionally, the h-point location is unique to each vehicle and many design criteria related to various vehicle aspects such as safety, interior packaging, visibility, and seating are based off of the h-point location.

Referring now to FIG. 22, a cross-sectional view of the fluid cells 218, taken along line XXII-XXII of FIG. 20, is shown. The differences in support provided by the fluid cells 218 for variously sized occupants, such as the $50^{th}$ percentile adult female 262 and the $120^{th}$ percentile adult male 266, is further demonstrated. The distance of a knee joint 270 of the occupant above the floor 134 will vary with the height of the occupant. The variation in the distance of the occupant's knee joint 270 above the floor 134 (FIG. 3) in turn alters the support required of the fluid cells 218.

Referring to FIGS. 23-25, cross-sectional views of the rear seating assembly 167 are shown, taken along the line XXIII-XXIII of FIG. 11. The cross-section is taken along the rear seating assembly 167 across the width of the vehicle to show the capabilities of the fluid cells 218 of the inflatable member 82 to accommodate various sizes and quantities of occupants for the rear seating assembly 167. In one embodiment the rear seating assembly 167 is a bench seat equipped with one continuous inflatable member 82 with the support structure 226 abutting the underside of the lower sheet 212. In alternative embodiments the rear seating assembly 167 is equipped with more than one inflatable member 82, which can be independently or commonly inflatable. Additionally, the inflatable members 82 for the rear seating assembly 167 can be modular in construction or interconnected with adjacent inflatable members 82. The inflatable member 82 is equipped with the plurality of fluid cells 218. The fluid cells 218 can configure to support a variety of occupants. For example, the fluid cells 218 can configure to support three $95^{th}$ percentile adult males (FIG. 23). Alternatively, the fluid cells 218 can configure to support four $50^{th}$ percentile adult females (FIG. 24). Further, the fluid cells 218 can configure to support two $50^{th}$ percentile adult females and a $95^{th}$ percentile adult male (FIG. 25). In each of these examples the upper sheet 209 presents a substantially smooth surface to the occupant. These examples serve to demonstrate the highly customizable nature of the inflatable members 82 and are not intended to be limiting.

Referring now to FIG. 26, a schematic view of one embodiment of the fluid delivery assembly 214 is shown. At least a portion of the fluid delivery assembly 214 can be located within or beneath the seatback 42. The present embodiment of the fluid delivery assembly 214 utilizes at least one bellows 274 in fluid communication with the fluid delivery assembly 214 to passively recover pressure within the fluid cells 218. The passive pressure recovery occurs, for example, once an occupant ceases occupying the vehicle seating assembly 30 equipped with the inflatable member 82. The plurality of fluid cells 218 are in fluid communication with the bellows 274. Each of the plurality of fluid cells 218 is in fluid communication with at least one of the other fluid cells 218. A first end of a fluid fill point 278 is in fluid communication with the fluid supply 246. A second end of the fluid fill point 278 is fluidly coupled to a three-way junction 282. The fluid fill point 278 can be a valve, such as a Schrader valve. The three-way junction 282 includes check valves 250 on each of the capillaries that make up the three-way junction 282. The check valves 250 at the three-way junction 282 prevent fluid from exiting the fluid delivery assembly 214 via the capillaries. The fluid supply 246 in the present embodiment is used to initially charge the inflatable member 82 during manufacture. After initial charging, the fluid supply 246 can be removed from the fluid fill point 278, at which point any recharging of the inflatable member 82 is accomplished by the at least one bellows 274. When initially charged the fluid flows through the capillaries as shown by bold arrows 286 overlaid upon the capillaries. To resupply the fluid delivery assembly 214 with fluid each of the bellows 274 are in fluid communication with an inlet check valve 290. In one embodiment, the inlet check valves 290 are open to air at atmospheric pressure such that when a below atmospheric pressure is present in the at least one bellows 274, the inlet check valves 290 open and restore atmospheric pressure to the bellows 274, which in turn can restore the fluid cells 218 to at least atmospheric pressure. If the fluid pressure in any of the fluid cells 218 is under pressure, then when the vehicle seating assembly 30 is re-occupied, and the surface of the inflatable member 82 is compressed, the fluid pressure within the bellows 274 will exceed the fluid pressure in the fluid cell 218 and thus add fluid pressure to the under pressurized fluid cell 218. That is to say, the bellows 274 can be designed to provide a supply pressure that is fractionally above the normal occupied pressure of the fluid cells 218. The fluid delivery assembly 214 is further equipped with at least one stopcock 294 that controls the direction of fluid flow within the fluid delivery assembly 214. Specifically, the stopcock 294 can be automatically opened or closed based upon the rotational position of the seatback 42 to redistribute fluid within the inflatable member 82. Alternatively, the stopcock 294 can be opened to redistribute fluid within the inflatable member 82 for comfort preferences or during configurations when the seatback 42 is in a forward-dumped or closed position. During normal operation of the fluid delivery assembly 214 the stopcock 294 is in a closed state, which allows fluid to pass through the capillary such that fluid communication is maintained between the fluid cells 218 as shown. The stopcock 294 can be opened to release fluid pressure within the fluid delivery assembly 214 to allow the vehicle seating assembly 30 to be placed in the closed configuration. Alternatively, or in addition to, the stopcock 294 can be configured to release fluid pressure within the fluid delivery assembly 214 in the event that the fluid pressure exceeds a predetermined threshold. Releasing fluid pressure above a predetermined threshold can be used, for example, to prevent fluid pressures great enough to cause rupture of the inflatable member 82. In another alternative embodiment, the stopcocks 294 are configured to control fluid flow by allowing or preventing backflow from fluid cells 218 at the front of the inflatable member 82 to the fluid cells 218 in the middle of the inflatable member 82.

Figure 27:
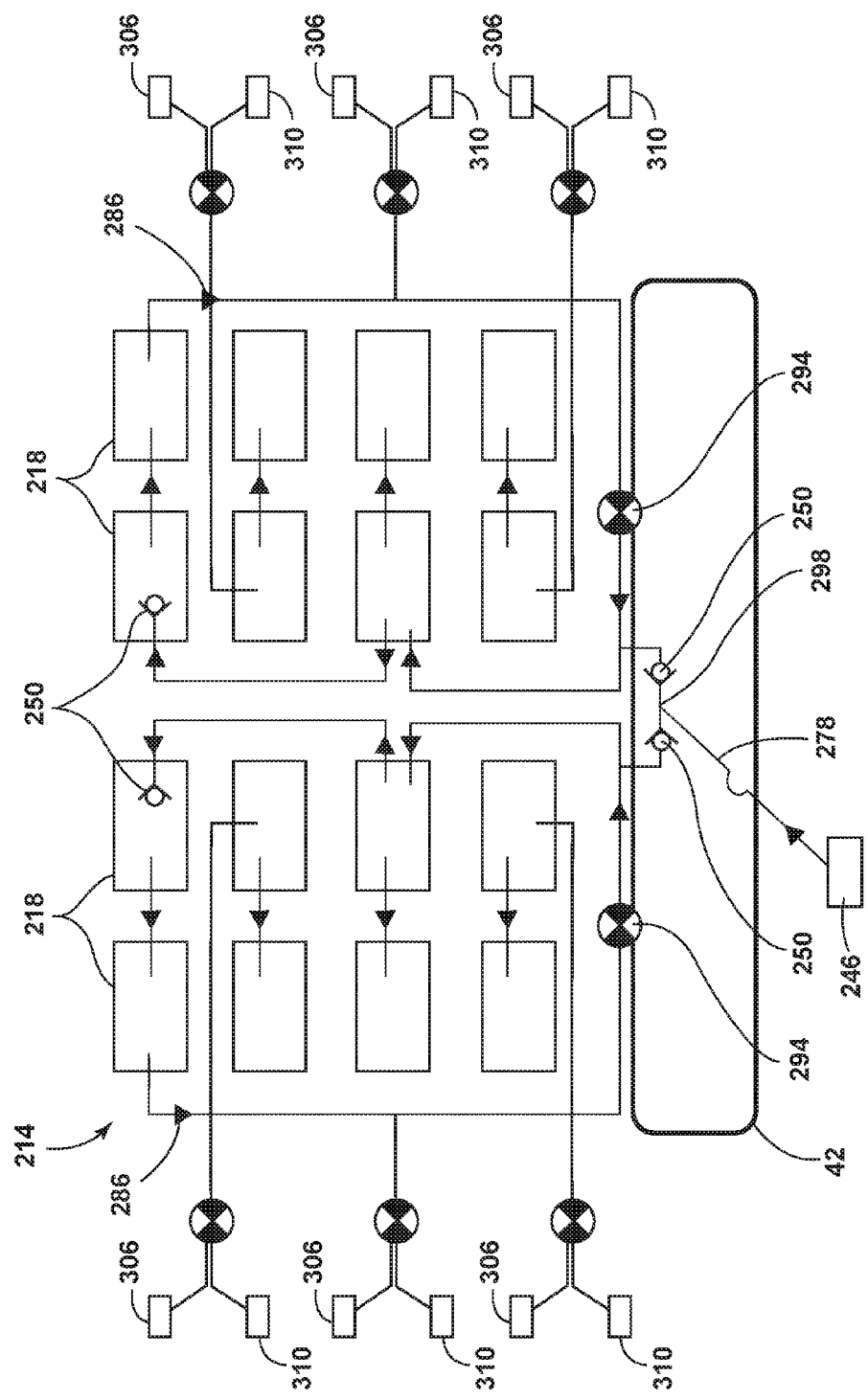
FIG. 27 is a schematic view of another embodiment of the fluid delivery assembly.

Referring to FIG. 27, a schematic view of another embodiment of the fluid delivery assembly 214 is shown. At least a portion of the fluid delivery assembly 214 can be located within or beneath the seatback 42. The present embodiment of the fluid delivery assembly 214 utilizes the fluid supply 246 in a continuous manner to actively provide pressure to the fluid cells 218. Each of the plurality of fluid cells 218 is in fluid communication with at least one of the other fluid cells 218. The first end of the fluid fill point 278 is in fluid communication with the fluid supply 246. The second end of the fluid fill point 278 is fluidly coupled to a two-way junction 298. The fluid fill point 278 can be a valve, such as a Schrader valve. The two-way junction 298 includes the check valves 250 on each of the capillaries that make up the two-way junction 282. The check valves 250 at the two-way junction 298 prevent fluid from exiting the fluid delivery assembly 214 via the capillaries. The check valves 250 at the two-way junction 298 also maintain independent operation of the left and right sides of the fluid delivery assembly 214. Without the independent operation of the left and right sides of the fluid delivery assembly 214, when an occupant shifted their weight to one side, then the fluid from those fluid cells 218 could transition to the other side of the fluid delivery assembly 214. In such an instance with the occupant's weight on one side of the fluid delivery assembly 214 and the fluid transitioned to the other side of the fluid delivery assembly 214, the occupant could find themselves unceremoniously ejected from the vehicle seating assembly 30. The fluid supply 246 in the present embodiment is used to both initially charge the inflatable member 82 during manufacture and maintain the desired and customizable firmness of the plurality of fluid cells 218 during the life of the inflatable member 82. When initially charged the fluid flows through the capillaries as shown by bold arrows 286 overlaid upon the capillaries. When at least one of the fluid cells 218 falls below the predetermined and customizable threshold, resupplying the fluid delivery assembly 214 with fluid is accomplished by activating the fluid supply 246 to supply fluid until the predetermined and customizable threshold is met. In one embodiment, the fluid supply 246 is an air compressor. The fluid delivery assembly 214 is further equipped with the at least one stopcock 294 that controls the direction of fluid flow within the fluid delivery assembly 214. The stopcock 294 can be opened to resupply portions of the inflatable member 82 with fluid. Alternatively, the stopcock 294 can be opened to redistribute fluid within the inflatable member 82 for comfort preferences or during configurations when the seatback 42 is in a forward-dumped or closed position. During normal operation of the fluid delivery assembly 214 the stopcock 294 is in the closed state, which maintains an initial pressure setting within the fluid cells 218. The stopcock 294 can be opened to redistribute fluid pressure within the fluid delivery assembly 214 to allow the vehicle seating assembly 30 to be placed in the closed configuration. Alternatively, or in addition to, the fluid delivery assembly 214 can be equipped with a plurality of control valves 302, which are strategically positioned and in fluid communication with at least some of the fluid cells 218. The control valves 302 can each be fluidly coupled to an inflation member 306 and/or a deflation member 310. The control valves 302 can be three-way valves that can selectively be actuated to close the control valve 302 to the inflation member 306, the deflation member 310, and/or the fluid delivery assembly 214. The deflation member 310 can be used to evacuate fluid pressure from the fluid cells 218 to which the control valves 302 are coupled. Evacuating the fluid pressure from the fluid cells 218 can be done for various purposes such as, but not limited to, decreasing the firmness of the inflatable member 82 or rapidly deflating the inflatable member 82 to accomplish the closed configuration. The stopcock 294 can be configured to release fluid pressure within the delivery assembly 214 in the event that the fluid pressure exceeds a predetermined threshold. Further, the stopcock 294 can be opened to vent a higher than desired pressure, which equates to the firmness of the inflatable member 82, for a subsequent user of the inflatable member 82. Releasing fluid pressure above a predetermined threshold can be used, for example, to prevent fluid pressures great enough to cause rupture of the inflatable member 82. The fluid delivery assembly 214 can also be equipped with a vent valve that is in fluid communication with the fluid delivery assembly 214. The vent valve can be placed in a sealed configuration when the seatback 42 is in the open configuration. When the seatback 42 is placed in a forward-dumped or closed configuration, the vent valve can be automatically opened to release pressure from the inflatable member 82.

Figure 28:
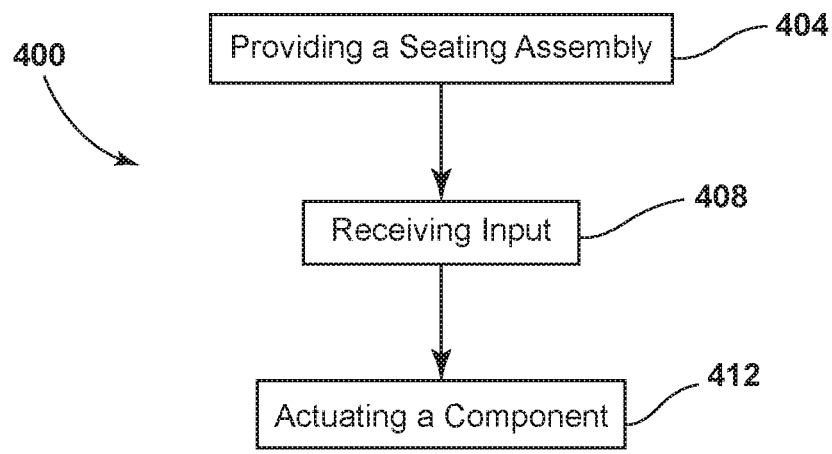
FIG. 28 is a flow chart according to one embodiment of a method for configuring a vehicle seating assembly.

Turning to FIGS. 28-33, methods of configuring the vehicle seating assembly 400A-F are shown according to various embodiments. In FIG. 28, method 400A includes the step 404 of providing a vehicle seating assembly 30, which includes the seat rotational member 50 that rotatably couples the lower leg support 34 to the seat 38, the seatback rotational member 54 that rotatably couples the seat 38 to the seatback 42, and the headrest rotational member 58 that rotatably couples the seatback 42 to the headrest 46. The method further includes the step 408 of receiving input of a user's desired configuration of the vehicle seating assembly 30 and adjusting the pressure within the plurality of fluid cells 218. The method also includes the step 412 of actuating at least one of the seat rotational member 50 and the seatback rotational member 54 to configure the vehicle seating assembly 30 in the desired configuration.

Figure 29:
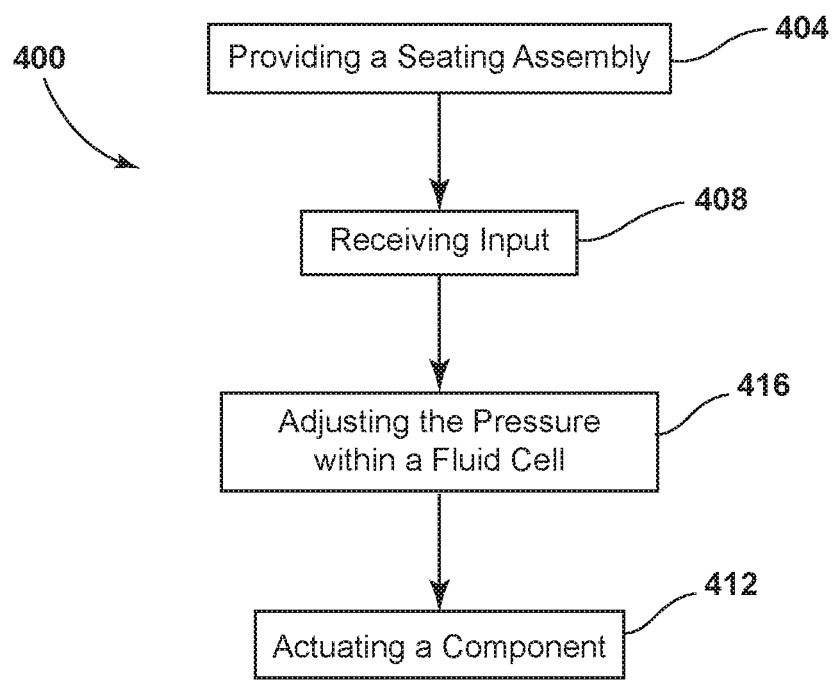
FIG. 29 is a flow chart according to one embodiment of a method for configuring a vehicle seating assembly.

Referring to FIG. 29, the method 400B of configuring the vehicle seating assembly includes the step 404 of providing a seating assembly. The method 400B further includes the step 408 of receiving input. The input that is received can be, for example, user preferences for comfort features, preferred seating assembly configurations, and/or seating assembly location within the interior of the vehicle. The method 400B can also include the step 416 of adjusting the pressure within a fluid cell. The method 400B, or a subsection of the method, can conclude with the step 412 of actuating a component of the vehicle seating assembly 30. The method 400B, as disclosed herein, can be used in conjunction with a fleet of autonomous vehicles. Several steps can be included between when the user of the autonomous vehicle requests a fleet vehicle and when the user reaches their desired drop-off location. The steps can include the user of the fleet vehicle specifying a desired vehicle seating assembly 30 configuration for their use. The seating configurations can include configurations that provide cargo storage and/or cargo securing members to prevent cargo from shifting while en route to their drop-off location.

Figure 30:
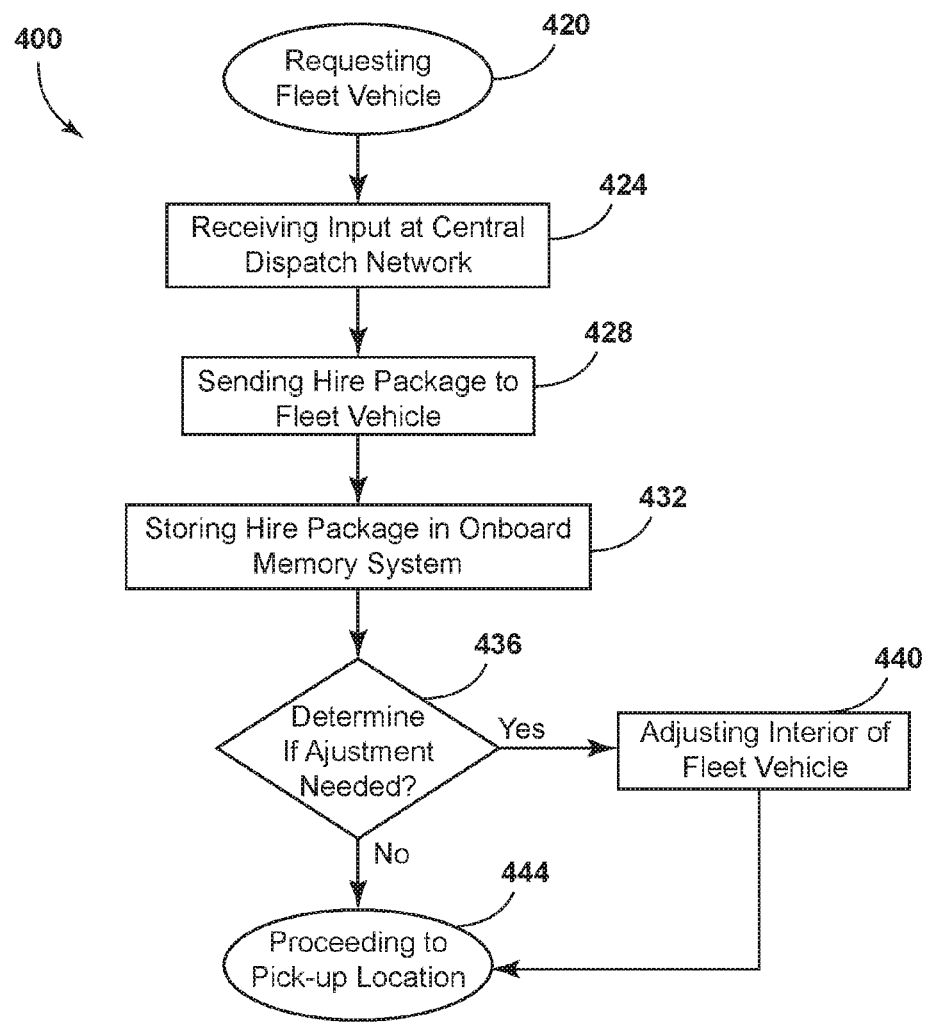
FIG. 30 is a flow chart according to one embodiment of a method for configuring a vehicle seating assembly.

Referring now to FIG. 30, the method 400C of configuring the vehicle seating assembly can include the step 420 of requesting a fleet vehicle from a fleet of autonomous vehicles. The request is then received as an input at a central dispatch network at step 424. The central dispatch network can then send a hire pack to a fleet vehicle 428 that contains information about the user's request and/or preferences. The fleet vehicle can then store the hire package in an onboard memory system 432. The fleet vehicle then references the hire package and compares the user's request and/or preferences against the current configuration of the interior of the vehicle. The fleet vehicle can then determine if adjustment is needed at step 436. If no adjustment is needed, then the fleet vehicle proceeds to the pick-up location at step 444. If adjustment is needed, then the fleet vehicle adjusts the interior of the fleet vehicle at step 440. After adjusting the interior of the fleet vehicle 440, if needed, then the fleet vehicle proceeds to the pick-up location at step 444.

The method of configuring the vehicle seating assembly 400C can further include a control network and a download confirmation event. More specifically, the control network can be located at the central dispatch network and can include the steps of checking the user of the fleet vehicle against a known database of previous users of the fleet of autonomous vehicles. If the user of the fleet vehicle is in the known database of previous users of the fleet of autonomous vehicles, then previous settings, configurations, and/or preference can be referenced by the fleet vehicle. A pick-up location and drop-off location of the user are also logged in the control network. Once the pick-up location, drop-off location, and/or previous settings are known, then the selection of the fleet vehicle to execute the request of the user is optimized by the control network. The control network can then allocate the optimally selected fleet vehicle to the user's request. Once allocated, the fleet vehicle downloads the user's requirements to the fleet vehicle. Upon completion of the download of the user's requirements, the fleet vehicle confirms the success of the download to the control network.

After the fleet vehicle confirms the success of the download to the control network, the fleet vehicle begins navigating to the pick-up location of the user. While en route to the user the fleet vehicle configures to the requirements of the user. For example, the configuration of the vehicle seating assembly 30, including its location within the vehicle (e.g. front left, front right, front center, rear left, rear right, or rear center), is communicated to the fleet vehicle. Unoccupied vehicle seating assemblies 30 can be configured as desired or required by the user. For example, a cargo preference of the user can be communicated to the fleet vehicle, wherein the cargo dimensions are provided by the user and the fleet vehicle can then configure to accommodate the cargo and either provide a stowing area for the cargo (e.g. in a compartment) or provide restraints to secure the cargo (e.g. to the floor 134 or to one of the vehicle seating assemblies 30). Additionally, the fleet vehicle and/or the control network can transmit the location of the fleet vehicle in real time to the user such that idle time is minimized for both the user and the fleet vehicle.

Figure 31:
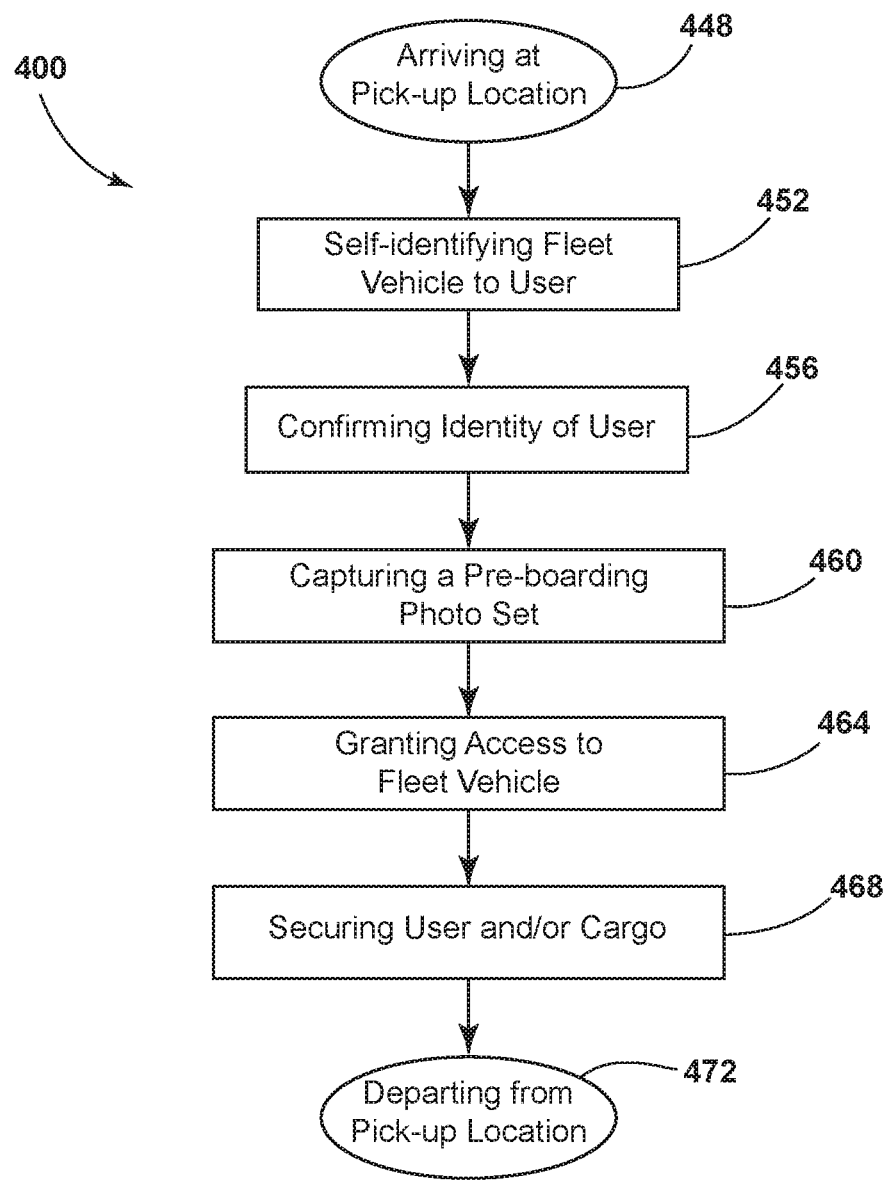
FIG. 31 is a flow chart according to one embodiment of a method for configuring a vehicle seating assembly.

Referring to FIG. 31, with method 400D, once the fleet vehicle arrives at the pick-up location at step 448 the fleet vehicle can identify itself to the user at step 452 to ensure the user has approached the correct fleet vehicle. Additionally, as the user approaches the fleet vehicle a camera or other identification mechanism can identify the user at step 456 based on biometrics, personal identification number, or the like. This bilateral identification ensures the user utilizes their designated/assigned fleet vehicle. After the identification process is accomplished the fleet vehicle requests confirmation that no configuration changes to the vehicle seating assemblies 30 are required. If configuration changes are required, then the changes are made prior to the fleet vehicle's doors opening, which minimizes the pinching and/or crushing hazards associated with the movable components. Once the configuration changes are complete the configurations of the vehicle seating assemblies 30 are locked while the user(s) occupy the interior of the fleet vehicle. To ensure fleet cleanliness, safety, and user accountability a pre-boarding photo set may be taken at step 460 of the interior of the fleet vehicle. The pre-boarding photo set can then be compared to an exit photo set (FIG. 33) for differences. Following the pre-boarding photo set step 460, the fleet vehicle opens one or more doors to grant access to the fleet vehicle at step 464, the vehicle seating assembly 30 configuration(s), and/or the cargo space requested. The user and/or cargo can be tethered or restrained manually by utilizing the presented restraints at step 468. Once the restraints have been secured into receiving portions, such as belt buckles, the restraints are safety checked and locked in preparation for the transit of the fleet vehicle. Once all safety checks and other departure checks are successfully completed, the fleet vehicle is ready to depart from the pick-up location at step 472.

After the user or users have situated themselves in the fleet vehicle the doors of the fleet vehicle close and the user is asked if any changes have been made to the drop-off location. Following confirmation of, or changes to, the drop-off location, seat belt and/or cargo security is confirmed and the fleet vehicle begins transporting the user to the drop-off location autonomously. While en route to the drop-off location the user can adjust comfort settings that do not present safety risks (e.g. firmness of the inflatable members 82, recline angle of the vehicle seating assembly 30, etc.). Additionally, the user is permitted to adjust the drop-off location en route at any time to accommodate sudden plan changes that may occur en route.

Figure 32:
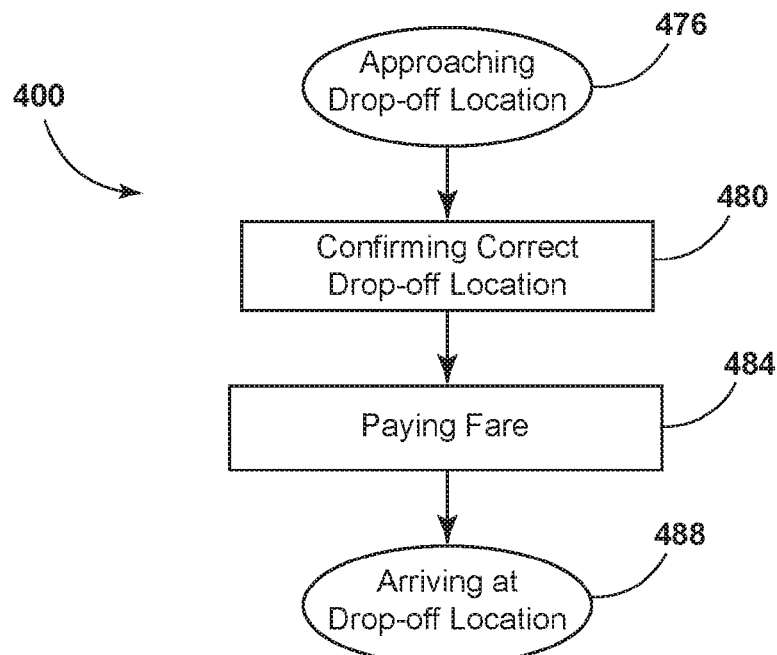
FIG. 32 is a flow chart according to one embodiment of a method for configuring a vehicle seating assembly.

Referring now to FIG. 32, with method 400E, when approaching the drop-off location at step 476 the fleet vehicle requests confirmation that the drop-off location is the correct destination at step 480. Upon confirmation by the user of the fleet vehicle, the fleet vehicle prompts the user to confirm their method of payment. The fleet vehicle is equipped to accept multiple payment methods, which include, but are not limited to, credit cards, debit cards, bank accounts, user profiles, and the like. Once the payment method has been confirmed, the user pays the fare at step 484 due to the fleet vehicle upon arrival at the drop-off location at step 488.

Figure 33:
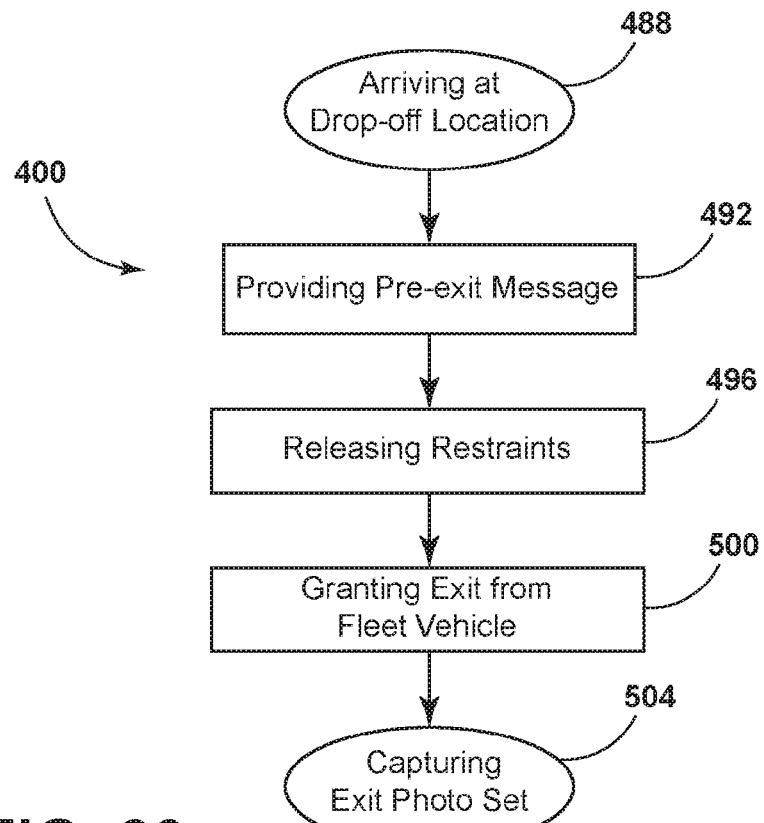
FIG. 33 is a flow chart according to one embodiment of a method for configuring a vehicle seating assembly.

Referring to FIG. 33, with method 400F, once the fleet vehicle arrives at the drop-off location at step 488 a pre-exit message is given to the user at step 492. During or following the exit message, the restraints, such as the seat belt and/or cargo restraints are released at step 496. The cargo restraints automatically retract into a stowed position. In the event that the retracting cargo restraints do not fully retract, the user will be asked to assist in the stowing of the cargo restraints. Next, the user is granted permission to exit from the fleet vehicle at step 500 by opening at least one of the doors of the fleet vehicle. The door(s) of the fleet vehicle that open may be chosen based upon predetermined safety requirements. For example, the door(s) that are proximal to a non-traffic side of the fleet vehicle, such as the sidewalk, are opened to allow safe egress of the user and/or cargo. Following the exit of the user, and the removal of any cargo, the exit photo set may be taken at step 504. If the exit photo set 504 is equivalent to the pre-boarding photo set, then no warning is given and the door(s) of the fleet vehicle are closed. However, if there is a difference between the pre-boarding photo set and the exit photo set that is not attributable to mere changes in light and/or shadow, then an audible warning may be given to alert the user. If after the audible warning is given there is no response from the user that recently exited the fleet vehicle, then the door(s) of the fleet vehicle are closed and the pictures are remotely reviewed by a human network operator for classification. If the difference(s) between the pre-boarding photo set and the exit photo set is/are deemed to be significant (e.g. cell phone, wallet, purse, child, etc.), then action is taken to remedy the situation. These remedies include, but are not limited to, placing a call to the previous user, alerting bystanders, and/or contacting emergency assistance. Alternatively, if the difference between the pre-boarding phot set and the exit photo set is deemed to be insignificant (e.g. trash), then the fleet vehicle can provide an audible apology to the next user and request that the next user assist in restoring the interior of the fleet vehicle by discarding the insignificant item in the onboard waste receptacle. Following a determination that the fleet vehicle is suitable for another user, the fleet vehicle communicates its immediate availability to the control network. The control network can then allocate the fleet vehicle to another user, at which point the method can be repeated as necessary or desired.

The fleet of autonomous vehicles can be equipped with various price points of fleet vehicles. These various price points can be based upon the degree of articulation or customization of the vehicle seating assemblies 30. For example, an economy price point can provide the vehicle seating assemblies 30 in either the open configuration or the closed configuration. An economy-plus price point can provide the vehicle seating assemblies 30 as multi-position articulated seating assemblies. The economy-plus price point can provide various comfort and relaxation configurations not offered in the economy price point fleet. A third price point, for example an economy-preferred price point, can provide the greatest degree of articulation and customization of the vehicle seating assemblies 30. The economy-preferred price point can offer various premium configurations, such as the desk configuration, the projection surface configuration, a table configuration, a footrest configuration, a bed configuration, etc. The table configuration and the footrest configuration can, for example, be additional uses of the closed configuration. Alternatively, the table configuration and the footrest configuration can be variants of the closed configuration. For example, the table configuration and the footrest configuration can be similar to the closed configuration with the differences between the configurations lying in the tilt angle of the vehicle seating assembly 30 and/or the elevation level of the vehicle seating assembly 30 relative to the floor 134 and/or the compartment 130.

For the economy price point, a central dispatch network may receive a request from the user that desires to hire a fleet vehicle from the fleet of autonomous vehicles. The central dispatch network may then send a hire package to the assigned fleet vehicle. The hire package can include information about the user and/or the user's request, such as the seating arrangement. The fleet vehicle can then store this information within an onboard memory system. The onboard memory system then accesses the hire package and begins adjusting the configuration of the vehicle seating assemblies 30 to fulfill the user's request while en route to the pick-up location. Typical reconfigurations at this price point include, but are not limited to, deploying the vehicle seating assembly 30 to the open configuration, articulating the vehicle seating assembly 30 from the open configuration to the closed configuration, and lowering the vehicle seating assembly 30 from the closed configuration to the stowed configuration. The various configurations that are possible for the vehicle seating assembly 30 can be controlled by a seat sequence control unit, which may be a dedicated controller or a shared controller, such as a body control module.

In one embodiment, the seat sequence control unit deploys the vehicle seating assembly 30 from the stowed configuration by first confirming that the fleet vehicle is empty and the doors are closed. Next, the fleet vehicle can confirm that the vehicle seating assembly 30 is in the stowed position with the cover 165 in the closed position. The pressure available within the fluid supply 246 is then queried to ensure sufficient pressure to provide the vehicle seating assembly 30 in the open configuration. If sufficient pressure is available within the fluid supply 246, then a deployment sequence is initiated. If the cover 165 is in the closed position, then the cover 165 is retracted into the open position. Once the cover 165 is in the open position, the elevating system 126 elevates the vehicle seating assembly 30 from the stowed configuration to the closed configuration. Once the elevating system 126 has fully raised the elevating platform 74, the first plurality of locks 138 and the corner locks 142 of the elevating platform 74 engage and the fleet vehicle confirms successful raise and lock of the elevating platform 74. In some embodiments a closure lock is provided to lock the vehicle seating assembly 30 in the closed configuration. Following, or simultaneous to, the raising and locking of the elevating platform 74 the closure lock is released. The inflatable members 82 are then pressurized and the seatback rotational member 54 articulates the seatback 42 clockwise away from the seat 38. Once the seatback rotational member 54 has articulated the seatback 42 to a predetermined angle relative to the seat 38, then the seatback rotational member 54 is locked to prevent movement of the seatback 42. During the articulation of the seatback rotational member 54, or following the locking of the seatback 42 position, the inflatable members 82 are continuously pressurizing. The seat 38 and the seatback 42 inflatable members 82 reach a predetermined pressure and the predetermined pressure is maintained. Finally, the fleet vehicle confirms the successful deployment and locking of the vehicle seating assembly 30 in the open configuration. At the economy price point, the vehicle seating assembly 30 may forego the headrest 46 and the lower leg support 34 while still providing the seat 38 and the seatback 42.

In another embodiment, the seat sequence control unit stows the vehicle seating assembly 30 from the open configuration to the stowed configuration by first confirming that the fleet vehicle is empty and the doors are closed. Next, the fleet vehicle can confirm that the vehicle seating assembly 30 is in the open configuration with the cover 165 retracted in the open position. The fluid pressure from the plurality of fluid cells 218 of the inflatable members 82 is then removed by activating the deflation members 310 and actuating the control valves 302. Once the inflatable members 82 have been sufficiently deflated, the fluid delivery assembly 214 within the inflatable members 82 is sealed to prevent inadvertent inflation of the inflatable members 82 when the vehicle seating assembly 30 is in the closed and/or stowed configurations. Next the seatback rotational member 54 is articulated counter-clockwise toward the seat 38 and the closure lock can be engaged to lock the seat 38 and seatback 42 in the closed configuration. Once the closed configuration is accomplished the interaction between the first plurality of locks 138 and the corner locks 142 of the elevating platform 74 is disengaged. The elevating platform 74 can then be lowered by the elevating system 126 into the compartment 130 within the floor 134 of the fleet vehicle. Once lowered into the compartment 130 within the floor 134 of the fleet vehicle, the corner locks 142 on the elevating platform 74 engage with the second plurality of locks 146 to secure the vehicle seating assembly 30 in the stowed configuration. The fleet vehicle can then confirm that the vehicle seating assembly 30 has been lowered and locked into the compartment 130 in the floor 134 of the fleet vehicle. Finally, the cover 165 is placed in the closed position by extending the cover 165 across the upper portion of the compartment 130.

For the economy-plus and/or the economy-preferred price points the central dispatch network receives a request from the user that desires to hire a fleet vehicle from the fleet of autonomous vehicles. The central dispatch network then sends the hire package to the assigned fleet vehicle. The hire package can include information about the user and/or the user's request, such as the seating arrangement and personalized comfort settings. The fleet vehicle can then store this information within the onboard memory system. The onboard memory system then accesses the hire package and transmits the preferences to a seat configuration module. The seat configuration module begins commanding the adjustments necessary to accomplish the configuration of the vehicle seating assemblies 30 to fulfill the user's request while en route to the pick-up location. Typical reconfigurations at this price point include, but are not limited to, deploying the vehicle seating assembly 30 to the open configuration, articulating the vehicle seating assembly 30 from the open configuration to the closed configuration, lowering the vehicle seating assembly 30 from the closed configuration to the stowed configuration, articulating the vehicle seating assembly 30 to custom relational angles between the lower leg support 34, the seat 38, the seatback 42, and the headrest, adjusting the surface temperature of the inflatable members 82 by using temperature controlled subsystems, and the like. The various configurations that are possible for the vehicle seating assembly 30 can be controlled by the seat sequence control unit.

In one embodiment of the economy-plus and/or economy-preferred price points, the seat sequence control unit raises the vehicle seating assembly 30 from the stowed position to the open position by first confirming the interior of the fleet vehicle is empty and the doors of the fleet vehicle are closed. Confirming the interior of the fleet vehicle is empty can be accomplished by camera images, video scans, and/or sensors. Confirming the doors of the fleet vehicle are closed can be accomplished by equipping the vehicle doors with rotary sensors at a hinge of the door that monitor the rotational displacement of the door relative to the fleet vehicle's door latch. The fleet vehicle then confirms that the cover 165 over the compartment 130 in the floor 134 of the fleet vehicle is in the closed position, which in turn confirms that the vehicle seating assembly 30 is in the stowed position. Confirming that the vehicle seating assembly 30 is in the stowed position can also be accomplished by contact switches, magnetic switches, or proximity sensors within the compartment 130. The pressure available within the fluid supply 246 is then queried to ensure sufficient pressure to provide the vehicle seating assembly 30 in the open configuration. If sufficient pressure is available within the fluid supply 246, then the deployment sequence is initiated. The deployment sequence begins with the retraction of the cover 165 into the open position and the disengagement of the interaction between the second plurality of locks 146 and the corner locks 142 of the elevating platform 74. The elevating system 126 then raises the vehicle seating assembly 30 out of the compartment 130. Once the elevating platform 74 reaches the raised position the corner locks 142 of the elevating platform 74 engage with the first plurality of locks 138 to secure the elevating platform 74 in the raised position. The elevating system 126 can be mechanically, hydraulically, or pneumatically driven. In embodiments where the elevating system 126 is pneumatically driven, an air pressure transducer can be provided in the elevating system 126 that monitors the pressure provided for raising and/or lowering the elevating platform 74. The fleet vehicle can confirm that the elevating platform 74 has reached the raised position in various ways. For example, a pressure switch can be provided on the elevating platform 74 or within the elevating system 126 that is compressed or otherwise engaged when the elevating platform 74 reaches the raised position. Once the raised position of the elevating platform 74 has been confirmed, the closure lock is released to permit articulation of the vehicle seating assembly 30. The seatback rotational member 54 is activated and articulates the seatback 42 clockwise away from the seat 38. The seat rotational member 50 is activated and articulates the lower leg support 34 counter-clockwise out of the recess 86 of the seat 38. The headrest rotational member 58 is activated and articulates the headrest 46 clockwise out of the recess 86 of the seatback 42. Simultaneous to, or following, these various articulations of the vehicle seating assembly 30 components, the inflatable members 82 that are associated with these components can begin the inflation process. Custom angles between these components of the vehicle seating assembly 30 can be selected by the user at this price point to optimize their personal comfort. The custom angles can be accurately provided by employing pulse counters that monitor the number of rotations of the seat rotational member 50, the seatback rotational member 54, and/or the headrest rotational member 58. Once the desired pressure (i.e. firmness) of the inflatable members 82 has been reached, the pressure is locked-in as a user-adjustable setting. The pressure in the inflatable members 82 can be monitored by a transducer in the fluid delivery assembly 214. Finally, the fleet vehicle confirms that the vehicle seating assembly 30 is deployed and secured in the open configuration.

The vehicle seating assembly 30 disclosed herein provides a superior level of articulation, customization, and automation. In recent years interest in autonomous vehicles and autonomous vehicle fleets has increased. To increase the likelihood that the general public will adopt the emerging autonomous vehicle fleets as their primary form of transportation the industry will need to make the autonomous vehicle fleet more attractive to the consumer than piloting their own vehicles. One approach to making the autonomous vehicle fleet more attractive than piloting your own vehicle is to impress the consumer with the seemingly limitless combinations and configurations of the interior of the autonomous vehicles. By providing a variety of configuration of the vehicle seating assemblies 30, the consumer is presented with the opportunity to travel in greater comfort, with greater productivity, and in an environmentally friendly fashion.

Enabling these various configurations can be accomplished by providing a highly customizable inflatable member 82 that is presented to the user across the surface of the vehicle seating assembly. The inflatable member 82, in addition to providing superior comfort to the user, helps to facilitate the various configurations and the transitions between configurations.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
a lower leg support;
a seat;
a seatback;
a headrest;
a seat rotational member that rotatably couples the lower leg support to the seat;
a seatback rotational member that rotatably couples the seat to the seatback;
a headrest rotational member that rotatably couples the seatback to the headrest;
a front latch coupled to a carrier plate, wherein the front latch is positioned between the carrier plate and the seat, and wherein the front latch releasably engages the seat;
an anchor member coupling the seatback rotational member to the carrier plate;
an elevating platform positioned below the carrier plate; and
a lift mechanism positioned between the carrier plate and the elevating platform, wherein the lift mechanism is coupled to both the carrier plate and the elevating platform, and wherein the lift mechanism is configured to manipulate the seat by performing at least one of raising, lowering, and tilting the seat.

2. The vehicle seating assembly of claim 1, wherein the lift mechanism further comprises a first and second lift jack operably coupled to a first and second motor, respectively.

3. The vehicle seating assembly of claim 2, wherein the first lift jack is coupled to the carrier plate by a first pivotable member, and wherein the second lift jack is coupled to the carrier plate by a second pivotable member.

4. The vehicle seating assembly of claim 2, wherein the first and second motors are screw-drive motors.

5. The vehicle seating assembly of claim 2, wherein the first and second motors are dual-ended drive motors.

6. The vehicle seating assembly of claim 2, wherein the first and second lift jacks are scissor jacks.

7. The vehicle seating assembly of claim 1, further comprising:
a skirt coupled to, and extending downward from, the carrier plate.

8. The vehicle seating assembly of claim 1, further comprising:
an elevating system positioned below and coupled to the elevating platform.

9. The vehicle seating assembly of claim 1, further comprising:
a first plurality of locks located at an upper portion of a compartment in a floor of a vehicle.

10. The vehicle seating assembly of claim 9, further comprising:
a second plurality of locks located at a lower portion of the compartment in the floor of the vehicle.

11. The vehicle seating assembly of claim 9, further comprising:
a cover retractably coupled to the floor of the vehicle and configured to conceal and protect said vehicle seating assembly when in a stowed configuration.

12. A vehicle seating assembly comprising:
a lower leg support;
a seat;
a seatback;
a seat rotational member that rotatably couples the lower leg support to the seat;
a seatback rotational member that rotatably couples the seat to the seatback; and
a front latch coupled to a carrier plate, wherein the front latch is positioned between the carrier plate and the seat, and wherein the front latch releasably engages the seat.

13. The vehicle seating assembly of claim 12, further comprising:
an anchor member coupling the seatback rotational member to the carrier plate.

14. The vehicle seating assembly of claim 12, further comprising:
an elevating platform positioned below the carrier plate.

15. The vehicle seating assembly of claim 14, further comprising:
a lift mechanism positioned between the carrier plate and the elevating platform.

16. The vehicle seating assembly of claim 15, wherein the lift mechanism is coupled to both the carrier plate and the elevating platform, and wherein the lift mechanism is concealed by the lower leg support.

17. A vehicle seating assembly comprising:
a lower leg support;
a seat;
a seatback;
a seat rotational member that rotatably couples the lower leg support to the seat; and
a seatback rotational member that rotatably couples the seat to the seatback.

18. The vehicle seating assembly of claim 17, wherein at least one of the seat rotational member and the seatback rotational member articulate to adjust said vehicle seating assembly between a first configuration and a second configuration.

19. The vehicle seating assembly of claim 18, wherein the first configuration and the second configuration are selected from the group consisting of open, closed, a desk, a table, a projection surface, stowed, and reclined.

20. The vehicle seating assembly of claim 17, further comprising:
a lift mechanism positioned between, and operably coupled to, a carrier plate and an elevating platform.

* * * * *